(12) United States Patent
Saito

(10) Patent No.: US 7,372,644 B2
(45) Date of Patent: May 13, 2008

(54) IMAGING LENS

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/603,873

(22) Filed: Nov. 22, 2006

(65) Prior Publication Data
US 2007/0133108 A1    Jun. 14, 2007

(30) Foreign Application Priority Data
Nov. 30, 2005 (JP) .............................. 2005-346844

(51) Int. Cl.
G02B 9/06 (2006.01)
G02B 3/02 (2006.01)
(52) U.S. Cl. ...................................... 359/794; 359/717
(58) Field of Classification Search ......... 359/793–795, 359/708, 717
See application file for complete search history.

(56) References Cited
U.S. PATENT DOCUMENTS
7,164,545 B2 * 1/2007 Saito ............................ 359/794
7,180,685 B2 * 2/2007 Wang et al. .................. 359/717

FOREIGN PATENT DOCUMENTS
JP        8-334684      12/1996
JP        2004-163850    6/2004
JP        2004-170460    6/2004

* cited by examiner

Primary Examiner—Huy Mai
Assistant Examiner—Jack Dinh
(74) Attorney, Agent, or Firm—William L. Androlia; H. Henry Koda

(57) ABSTRACT

An imaging lens including, in order from an object side towards an image surface side, a diaphragm, a first lens which is a meniscus lens having a positive power whose convex surface faces the object side, and a second lens which is a lens having a positive power whose convex surface faces the image surface side, wherein conditions expressed by each of following expressions (1)-(6) are to be satisfied; $1.25 \geq L/fl \geq 0.8$, $1 \geq f_1/f_2 \geq 0.2$, $1.8 \geq f_1/fl \geq 1$, $0.5 > d_2/d_1 \geq 0.2$, $0.35 \geq d_1/fl \geq 0.1$, and $0.27 \geq d_3/fl \geq 0.1$ (where, L: entire length of the lens system, fl: focal distance of the entire lens system, $f_1$: focal distance of the first lens, $f_2$: focal distance of the second lens, $d_1$: center thickness of the first lens, $d_2$: space between the first lens and the second lens on the optical axis, and $d_3$: center thickness of the second lens).

8 Claims, 31 Drawing Sheets

IMAGING LENS

BACKGROUND OF THE INVENTION

1. Field of the Invention

The present invention relates to an imaging lens. In particular, the present invention relates to an imaging system of a two-lens structure that is capable of reducing size and weight, enhancing optical performance, and improving productivity. The imaging lens is used for an image-taking device that forms an image of an object, such as scenery or a person, on an image-taking surface of a solid image pickup device such as a CCD, CMOS, etc. The solid image pickup device is mounted on a portable computer, a television phone, a portable phone, a digital camera, and the like.

2. Description of the Related Art

Recently, there has been an increasing demand for cameras that utilize a solid image pickup device, such as a CCD, CMOS, or the like, which is mounted on a portable phone, a portable computer, and a television phone, for example. It is demanded that a camera such as this is small and light because the camera is required to be mounted on a limited installation space.

Therefore, it is also necessary for the imaging lens used for such cameras to be similarly small and light. Conventionally, a single-lens structure lens system using a single lens is used as such imaging lens.

Such a single-lens structure lens system can sufficiently handle being applied to a solid image pickup device called CIF that has a resolution of about 110 thousand pixels. However, in recent years, the use of a solid image pickup device called VGA that has a high resolution of about 300 thousand pixels is being examined. There is a problem in that the conventional single-lens structure lens system cannot sufficiently exert the resolution performance of such high-resolution solid image pickup devices.

Therefore, conventionally, various two-lens structure lens systems and three-lens structure lens systems having an optical performance that is superior to that of the single-lens structure lens system have been proposed.

In this case, in the three-lens structure lens system, each aberration leading to the deterioration of the optical performance can be effectively corrected, thereby allowing an extremely high optical performance to be obtained. However, since the three-lens structure lens system has a large number of parts, it is difficult to reduce the size and weight. Since each component part requires high accuracy, the manufacturing costs increase, as well.

On the other hand, although the two-lens structure lens system cannot achieve an optical performance that is as high as that of the three-lens structure lens system, a higher optical performance than that of the single-lens structure lens system can be acquired. It can be said that the two-lens structure lens system is suitable for a small, high-resolution solid image pickup device.

As such a two-lens structure lens system, conventionally, numerous lens systems called a retro-focus-type in which a negative lens and a positive lens are combined have been proposed. It is possible to reduce costs of such retro-focus-type lens systems through a reduction of the number of parts. However, from this configuration, it is practically impossible to reduce the size and weight to about the size and weight of the single-lens structure lens system since the back focus distance increases.

As another two-lens structure lens system, there is a lens system called a telephoto-type in which a positive lens and a negative lens are combined. However, such telephoto-type lens systems had been developed for silver-salt photography, and therefore, the back focus distance of the telephoto-type lens system is too short. The telephoto-type lens system also has problems regarding telecentricity. It is difficult to apply the telephoto-type lens system as is to the imaging lens for solid image pickup devices.

Furthermore, conventionally, in the two-lens structure lens system or the three-lens structure lens system, a configuration in which a diaphragm is disposed between two lenses that are mutually adjacent in the optical axis direction is mainstream (for example, refer to Patent Literatures 1 and 2).

[Patent Literature 1] Japanese Patent Unexamined Publication 2004-163850

[Patent Literature 2] Japanese Patent Unexamined Publication 2004-170460

There is an increasing demand for further improvement of the optical performance, in addition to the reduction in size and weight, of these types of imaging lens. However, in a configuration in which the diaphragm is disposed between the two lenses, as in the imaging lens described in Patent Literatures 1 and 2, it is difficult to achieve both the reduction in size and weight and further improvement in the optical performance. Furthermore, it is difficult to accommodate the sensor characteristics (incident angle to the sensor).

SUMMARY OF THE INVENTION

Therefore, the present invention has been designed in view of the aforementioned problems. The object of the present invention is to provide an imaging lens that can sufficiently meet the demands for the reduction in size and weight and further improvement in the optical performance, and improve productivity.

In the present specifications, productivity means not only the productivity for mass-producing imaging lens (for example, moldability, cost, and the like when imaging lens are mass-produced by injection molding), but also easiness of processing, manufacture, etc. of equipment (for example, easiness of processing and the like of a mold used for injection molding), which is used for manufacturing the imaging lens.

In order to achieve the aforementioned object, the imaging lens according to a first aspect of the present invention is an imaging lens used for forming an image of an object on an image-taking surface of a solid image pickup device, which comprises, in order from an object side towards an image surface side: a diaphragm, a first lens which is a meniscus lens having a positive power whose convex surface faces the object side, and a second lens which is a lens having a positive power whose convex surface faces the image surface side, wherein conditions expressed by each of following expressions (1)-(6) are to be satisfied;

$$1.25 \geq L/fl \geq 0.8 \tag{1}$$

$$1 \geq f_1/f_2 \geq 0.2 \tag{2}$$

$$1.8 \geq f_1/fl \geq 1 \tag{3}$$

$$0.5 > d_2/d_1 \geq 0.2 \tag{4}$$

$$0.35 \geq d_1/fl \geq 0.1 \tag{5}$$

$$0.27 \geq d_3/fl \geq 0.1 \tag{6}$$

where,

L: entire length of the lens system fl: focal distance of the entire lens system $f_1$: focal distance of the first lens $f_2$: focal distance of the second lens $d_1$: center thickness of the first lens $d_2$: space between the first lens and the second lens on the optical axis $d_3$: center thickness of the second lens.

In the first aspect of the present invention, the diaphragm is disposed at a position closest to the object side. Thereby, it becomes possible to secure high telecentricity, and the incident angle of a light ray to the sensor of the solid image pickup device can be made more obtuse.

In the present invention, the diaphragm being disposed at a position closest to the object side does not interfere with the diaphragm being disposed in the same position on the optical axis direction as a point on the optical axis on the object side face (convex face) of the first lens, or the object side face of the first lens in the vicinity of the optical axis being positioned closer to the object side than the diaphragm through the diaphragm. Even in this case, the diaphragm is disposed at a position closer to the object side than the entire first lens, as a physical disposition. Therefore this does not go against the descriptions in the claims.

In addition, in the first aspect of the present invention, the first lens is a meniscus lens having a positive power whose convex surface faces the object side, the second lens is a lens having a positive power, and the power of each lens is regulated to satisfy each condition expressed by the expressions (1)-(6). With this, it is possible to improve productivity, while reducing size and weight.

An imaging lens according to a second aspect is the imaging lens according to the first aspect, wherein, further, the second lens is a meniscus lens.

In the second aspect of the present invention, further, it is possible to improve the optical performance of the periphery without placing a load on the shapes of the first lens and the second lens and more effectively use the light ray irradiated on the periphery of the solid image pickup device.

An imaging lens according to a third aspect is the imaging lens according to the first aspect, wherein, further, the object side surface of the second lens is convex towards the object side in the vicinity of the optical axis and is formed into an aspheric surface having an inflection point.

In the third aspect of the present invention, further, it is possible to further reduce the load placed on the shape of each lens and further improve the optical performance of the periphery. In addition, it is possible to more effectively use the light ray irradiated on the periphery of the solid image pickup device.

An imaging lens according to a fourth aspect is the imaging lens according to the third aspect, wherein, further, an outer end section of an effective diameter of the object side face of the second lens is positioned closer to the object side than a point on the optical axis on the object side surface of the second lens.

In the fourth aspect of the present invention, further, it is possible to further improve the optical performance of the periphery. In addition, there are advantages not only when handling the lenses, but also during assembly when the lenses are mounted on a barrel and made into a unit.

An imaging lens according to a fifth aspect is the imaging lens according to any one of aspects 1 to 4, wherein, further, a condition expressed by a following expression (7) is to be satisfied;

$$10 \geq f_2/fl \geq 1.5 \tag{7}$$

In the fifth aspect of the present invention, further, the expression (7) is satisfied. Thereby, productivity can be further improved, while appropriately securing the necessary back focus distance.

An imaging lens according to a sixth aspect is the imaging lens according to aspect 5, wherein, further, the diaphragm satisfies a condition expressed by a following expression (8);

$$0.2 \geq S \tag{8}$$

where,

S: distance between the diaphragm and the optical surface closest to the object side on the optical axis.

In the sixth aspect of the invention, further, the expression (8) is satisfied. Thereby, telecentricity can be more effectively secured and the size and weight can be further reduced.

An imaging lens according to a seventh aspect is the imaging lens according to aspect 6, wherein, further, a condition expressed by a following expression (9) is to be satisfied;

$$0.8 \geq Bfl/fl \geq 0.4 \tag{9}$$

where,

Bfl: back focus distance (distance from the last lens surface to the image-taking surface on the optical axis (air reduced length)).

In the seventh aspect of the invention, further, the expression (9) is satisfied. Thereby, the size and weight can be more effectively reduced, and productivity and manageability when assembling can be further improved.

An imaging lens according to an eighth aspect is the imaging lens according to aspect 7, wherein, further, a condition expressed by a following expression (10) is to be satisfied;

$$2.5 \geq Bfl \geq 0.8 \tag{10}$$

In the eighth aspect of the invention, further, the expression (10) is satisfied. Thereby, the size and weight can be more effectively reduced, and productivity and manageability when assembling can be further improved.

With the imaging lens according to the first aspect of the present invention, it is possible to achieve an imaging lens that has reduced size and weight, superior optical performance, and excellent productivity.

Further, in addition to the effects of the imaging lens according to the first aspect, the imaging lens according to the second aspect can achieve a small imaging lens that has a better improved optical performance, while maintaining excellent productivity, and can more effectively use the light ray irradiated on the periphery of the solid image pickup device.

Further, in addition to the effects of the imaging lens according to the first aspect, the imaging lens according to the third aspect can achieve a small imaging lens that has more superior optical performance, while maintaining excellent productivity, and can more effectively use the light ray irradiated on the periphery of the solid image pickup device.

Further, in addition to the effects of the imaging lens according to the third aspect, the imaging lens according to the fourth aspect can achieve an imaging lens that has more superior optical performance, while maintaining excellent productivity, and can more effectively use the light ray irradiated on the periphery of the solid image pickup device.

Further, in addition to the effects of the imaging lens according to any one of aspects 1 to 4, the imaging lens according to the fifth aspect can achieve an imaging lens that has more excellent productivity.

Further, in addition to the effects of the imaging lens according to any one of aspects 1 to 5, the imaging lens according to the sixth aspect can achieve an imaging lens that more effectively secures telecentricity and has more reduced size and weight.

Further, in addition to the effects of the imaging lens according to any one of aspects 1 to 6, the imaging lens according to the seventh aspect can achieve an imaging lens that has more reduced size and weight and more excellent productivity.

Further, in addition to the effects of the imaging lens according to any one of aspects 1 to 7, the imaging lens according to the eighth aspect can achieve an imaging lens that is suitable for further reduction in size and weight and further improvement in productivity.

DETAILED DESCRIPTION OF THE PREFERRED EMBODIMENT

An embodiment of the imaging lens according to the present invention will be described hereinafter by referring to FIG. 1.

Figure 1:
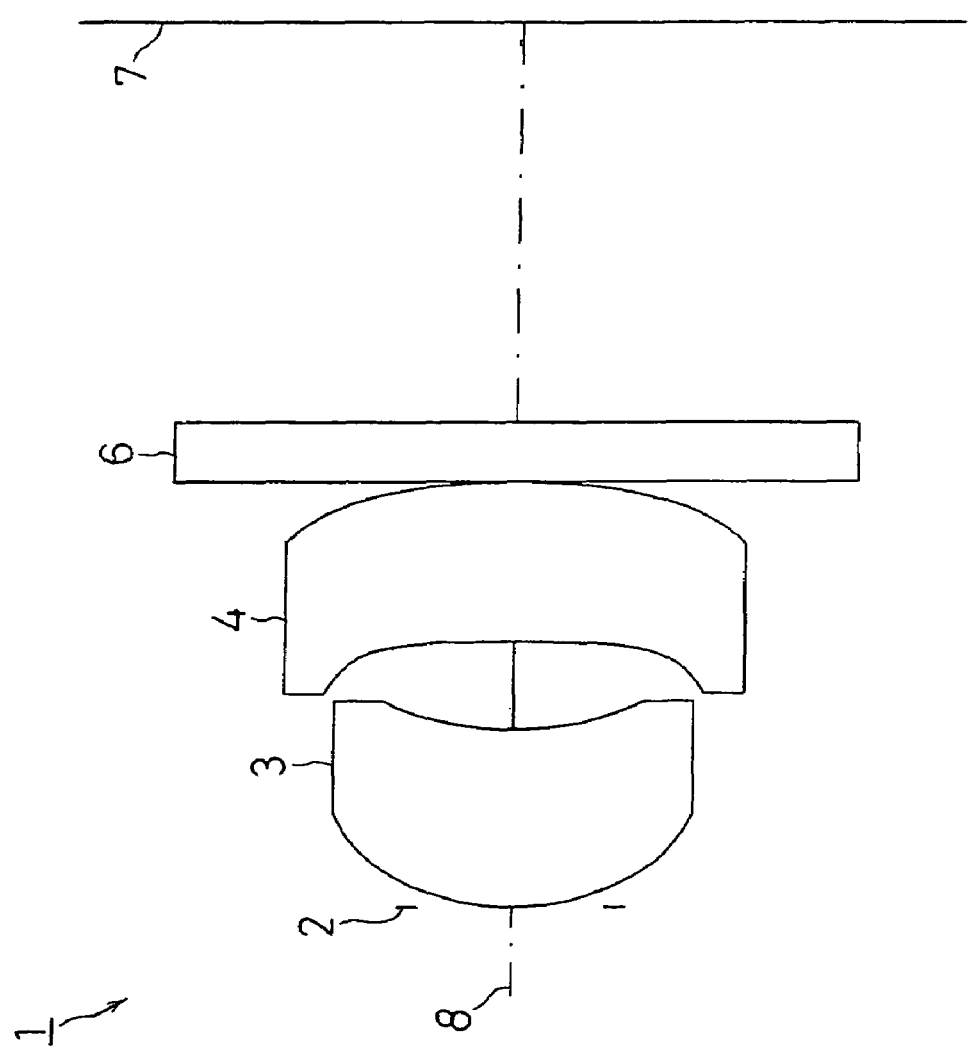
FIG. 1 is a schematic diagram for showing an embodiment of the imaging lens according to the present invention.

As shown in FIG. 1, an imaging lens 1 of the embodiment comprises, in order from the object side towards the image surface side, a diaphragm 2, a resin-type first lens 3 which is a meniscus lens having a positive power with its convex surface facing the object side, and a resin-type second lens 4 which is a lens having a positive power with its convex surface facing the image surface side.

Herein, each of the lens surfaces on the object side and the image surface side of the first lens 3 and the second lens 4 is respectively referred to as a first face and a second face.

On the second face side of the second lens 4, there are disposed various filters 6 such as a cover glass, an IR cut filter, and a lowpass filter, and an image-taking surface 7 which is a light-receiving surface of an image sensor element such as a CCD or a CMOS, respectively. The various filters 6 may be omitted as required.

The closer the position of the diaphragm 2 is to the image surface side, the closer the position of the exit pupil is to the image surface side. As a result, it becomes difficult to secure telecentricity. An off-axis light emitted from the imaging lens 1 is irradiated at an angle to the sensor of the solid image pickup device.

On the other hand, in the embodiment, the exit pupil can be positioned at a position far from the sensor face (image-taking surface) of the solid image pickup device, by the diaphragm 2 being disposed at a position closest to the object side.

Therefore, in the embodiment, high telecentricity can be secured and the incident angle of the light ray in relation to the sensor of the solid image pickup device can be made more obtuse.

In addition, in the embodiment, the diaphragm 2 is disposed on the object side of the first lens 3, and the first lens 3 has a meniscus-shape of which its convex surface faces the object side. Thereby, the second face of the first lens 3 can be effectively used.

Further, in the embodiment, the shape of the second face of the second lens 4 is convex towards the image surface side. Thereby, a higher telecentricity can be secured, and the incident angle to the sensor of the solid image pickup device can be more effectively controlled. Still further, the shape of the second face of the second lens 4 is more preferably an aspherical surface in which the curvature becomes larger the farther away from the optical axis 8 it is. With this, a higher telecentricity can be secured and the incident angle to the sensor of the solid image pickup device can be more effectively controlled.

Further, in the embodiment, the imaging lens 1 is to satisfy each condition expressed by the following expressions (1)-(6).

$$1.25 \geq L/fl \geq 0.8 \quad (1)$$

$$1 \geq f_1/f_2 \geq 0.2 \quad (2)$$

$$1.8 \geq f_1/fl \geq 1 \quad (3)$$

$$0.5 > d_2/d_1 \geq 0.2 \quad (4)$$

$$0.35 \geq d_1/fl \geq 0.1 \quad (5)$$

$$0.27 \geq d_3/fl \geq 0.1 \quad (6)$$

where, L in the expression (1) is the entire length of the lens system i.e., the optical distance between the surface physically closest to the object side and the image-taking surface. More specifically, when the first surface of the first lens 3 in the vicinity of the optical axis 8 is positioned closer to the image surface side than the diaphragm 2, the distance from the diaphragm 2 to the image-taking surface is L. At the same time, as described above, when the first surface of the first lens 3 in the vicinity of the optical axis 8 is positioned closer to the object side than the diaphragm 2 through the diaphragm 2, the distance from the first surface of the first lens 3, rather than the diaphragm 2, to the image-taking surface becomes L. In addition, when the diaphragm 2 is disposed at the same position in the optical axis 8 direction as the point on the optical axis 8 of the first surface of the first lens 3, the distance from the diaphragm 2 and the first surface of the first lens 3 to the image-taking surface becomes L. fl in the expressions (1), (3), (5), and (6) is the focal distance of the entire lens system. $f_1$ in the expressions (2) and (3) is the focal distance of the first lens 3. $f_2$ in the expressions (2) and (4) is the focal distance of the second lens 4. $d_1$ in the expressions (4) and (5) is the center thickness of the first lens 3. $d_2$ in the expression (4) is the space between the first lens 3 and the second lens 4 on the optical axis 8. $d_3$ in the expression (6) is the center thickness of the second lens 4.

When the value of the L/fl exceeds the value (1.25) shown in the expression (1), the entire optical system becomes too large and goes against the demand for reduction in size and weight. At the same time, when the L/fl becomes below the value (0.8) shown in the expression (1), the entire optical system becomes small. Thus, productivity is deteriorated and it becomes difficult to maintain the optical performance. In addition, it becomes difficult to secure the necessary back focus distance.

Therefore, by further setting the value of L/fl to satisfy the expression (1) in the embodiment, the size and weight of the imaging lens system can be sufficiently reduced, while maintaining the required back focus distance, and an excellent optical performance can be maintained.

It is more preferable for the relation between L and fl to satisfy an expression $1.2 \geq L/fl \geq 1.05$.

Further, when the value of $f_1/f_2$ exceeds the value (1) shown in the expression (2), the power of the first lens 2 becomes so strong that the productivity is deteriorated. In addition, the back focus distance becomes too long, making it difficult to reduce the size of the entire optical system. At the same time, when the value of $f_1/f_2$ becomes below the value (0.2), the productivity of the first lens 3 is deteriorated and it becomes difficult to secure the necessary back focus distance.

Therefore, by further setting the $f_1/f_2$ to satisfy the expression (2) in the embodiment, productivity can be further improved and the size and weight of the entire optical system can be sufficiently reduced, while more effectively securing the necessary back focus distance.

It is more preferable for the relation between $f_1$ and $f_2$ to satisfy an expression $0.9 \geq f_1/f_2 \geq 0.55$.

Further, when the value of $f_1/fl$ exceeds the value (1.8) shown in the expression (3), the back focus distance becomes too long, thereby making it difficult to reduce the size and weight. At the same time, when the value of $f_1/fl$ becomes below the value (1) shown in the expression (3), the productivity of the first lens is deteriorated.

Therefore, by further setting the value of $f_1/fl$ to satisfy the expression (3) in the embodiment, the size and weight can be further reduced and productivity can be improved It is more preferable for the relation between $f_1$ and fl to satisfy an expression $1.6 \geq f_1/fl \geq 1$.

Still further, when the value of $d_2/d_1$ becomes the value (0.5) shown in the expression (4) or larger, the power of the first lens 3 and the second lens 4 is required to be increased, thereby making it difficult to manufacture each lens 3 and 4. In addition, the height of the light ray passing through the image surface side face of the second lens 4 is high. Therefore, the power of the aspherical surface increases and manufacturing becomes more difficult. At the same time, when the value of $d_2/d_1$ is below the value (0.2) shown in the expression (4), the center thickness of the first lens 3 becomes relatively too thick. Thus, it becomes difficult to secure the back focus distance and insert a diaphragm that effectively limits the amount of light.

Therefore, by further setting the value of $d_2/d_1$ to satisfy the expression (4) in the embodiment, productivity can be further improved, the necessary back focus distance can be more appropriately secured, and more excellent optical performance can be maintained.

It is more preferable for the relation between $d_2$ and $d_1$ to satisfy an expression $0.5 > d_2/d_1 \geq 0.3$.

Still further, when the value of $d_1/fl$ exceeds the value (0.35) shown in the expression (5), the entire length of the optical system becomes too long, thereby making it difficult to reduce the size and weight. At the same time, when the value of $d_1/fl$ is below the value (0.1) shown in the expression (5), it becomes difficult to manufacture the first lens 3.

Therefore, by further setting the value of $d_1/fl$ to satisfy the expression (5) in the embodiment, the size and weight can be further reduced and productivity can be improved.

It is more preferable for the relation between $d_1$ and fl to satisfy an expression $0.25 \geq d_1/fl \geq 0.15$.

Still further, when the value of $d_3/fl$ exceeds the value (0.27) shown in the expression (6), the entire length of the optical system becomes too long, thereby making it difficult to reduce the size and weight. At the same time, when the value of $d_3/fl$ is below the value (0.1) shown in the expression (6), it becomes difficult to manufacture the second lens 4.

Therefore, by further setting the value of $d_3/fl$ to satisfy the expression (6) in the embodiment, the size and weight of the entire optical system can be further reduced and productivity can be improved.

It is more preferable for the relation between $d_3$ and fl to satisfy an expression $0.25 \geq d_3/fl \geq 0.15$.

In addition to the above-described structures, the second lens 4 is preferably a meniscus lens.

In this case, the optical performance of the periphery can be improved without placing a load on the shapes of the first lens 3 and the second lens 4 and the light ray irradiated on the periphery of the solid image pickup device can be more effectively used.

Furthermore, the first surface of the second lens 4 in the vicinity of the optical axis 8 preferably has a convex surface facing the object side and is formed into an aspherical surface having an inflection point.

Herein, the inflection point of the first surface of the second lens 4 is a point on a cross-section of the second lens 4 that includes the optical axis 8, in which a tangent contacting a curved line (a curved line on the cross-section) on the first surface of the second lens 4 changes the symbol of its angle.

Therefore, as described above, when the center section of the first surface of the second lens 4 has a convex surface facing the object side, the surface shape of the peripheral section surrounding the center section of the first surface changes to a concave surface facing the object side with the inflection point as the boundary.

As a result, the optical performance of the periphery can be improved without placing a load on the shapes of the first lens 3 and the second lens 4 and the light rays respectively passing through the lenses 3 and 4 can be more effectively used.

The first face of the second lens 4 can have a surface shape in which a plurality of inflection points appears toward the periphery from the optical axis 8. In this case, the various aberrations can be more favorably corrected.

Further, in addition to the above-described structures, the outer end section of the effective diameter of the object side face of the second lens is preferably positioned closer to the object side than the point on the optical axis on the object side surface of the second lens 4.

As a result, the optical performance of the periphery can be further improved. In addition, there are advantages not only when handling the lenses, but also during assembly when the lenses are mounted on a barrel and made into a unit.

Further, in addition to the above-described structures, it is more desirable to satisfy the following expression (7).

$$10 \geq f_2/fl \geq 1.5 \qquad (7)$$

Herein, when the value of $f_2/fl$ exceeds the value (10) shown in the expression (7), the productivity of the first lens 3 deteriorates and it becomes difficult to maintain the necessary back focus distance. At the same time, when the value of $f_2/fl$ becomes below the value (1.5) shown in the expression (7), the power of the second lens 4 becomes too strong, thereby deteriorating the productivity.

Therefore, by further setting the value of $f_2/fl$ to satisfy the expression (7) in the embodiment, the productivity can be further improved while further appropriately maintaining the necessary back focus distance.

It is more preferable for the relation between $f_2$ and fl to satisfy an expression $6 \geq f_2/fl \geq 1.5$.

Further, in addition to the above-described structures, it is more desirable if the diaphragm 2 satisfies the following expression (8).

S in the expression (8) is the distance between the diaphragm 2 and the optical surface closest to the object side on the optical axis 8. In other words, S is the distance between the diaphragm 2 and the first face of the first lens 3 on the optical axis 8. In addition, S is a physical distance. The diaphragm 2 can be positioned closer to either the object side or the image surface side than the point on the optical axis 8 on the first face of the first lens 3.

$$0.2 \geq S \qquad (8)$$

When S=0, the position of the diaphragm in the optical axis 8 direction is the same position as the point on the optical axis 8 on the first face of the first lens 3.

As a result, telecentricity can be further effectively maintained and the size and weight can be further reduced.

It is more preferable that S is $0.15 \geq S$.

Further, in addition to the above-described structures, it is more desirable to satisfy the following expression (9).

However, Bfl in the expression (9) is the back focus distance or, in other words, the distance from the last lens surface (second face of the second lens 4) to the image-taking surface 7 on the optical axis 8 (air reduced length).

$$0.8 \geq Bfl/fl \geq 0.4 \qquad (9)$$

As a result, the size and weight can be more effectively reduced, and productivity and manageability when assembling can be further improved.

It is more preferable for the relation between Bfl and fl to satisfy an expression $0.7 \geq Bfl/fl \geq 0.5$.

Further, in addition to the above-described structures, it is more desirable to satisfy the following expression (10).

$$2.5 \geq Bfl \geq 0.8 \qquad (10)$$

As a result, the size and weight can be more effectively reduced, and productivity and manageability when assembling can be further improved.

It is more preferable that Bfl is $2.0 \geq Bfl \geq 1.0$.

Further, in addition to the above-described structures, it is more desirable that fl satisfies $5 \geq fl \geq 1$ (more preferably $3.5 \geq fl \geq 1.5$).

As a result, a configuration that is more suitable for a lens used in a camera module that is mounted on a portable terminal and the like can be achieved.

Moreover, examples of a resin material used for molding the first lens 3 and the second lens 4 may be materials of various compositions with transparency, such as acryl, polycarbonate, amorphous polyolefin resin, etc. However, from the perspective of further improving the manufacturing efficiency and further reducing the manufacturing costs, it is preferable that the resin materials of both lenses 3 and 4 are unified and are the same resin material.

EXAMPLES

Next, EXAMPLES of the present invention will be described by referring to FIG. 2 or FIG. 31.

In the EXAMPLES, F no denotes F number and r denotes the curvature radius of the optical surface (the center radius curvature in the case of a lens). Further, d denotes a distance to the next optical surface, nd denotes the index of refraction when the d line (yellow) is irradiated, and vd denotes the Abbe number of each optical system also when the d line is irradiated.

k, A, B, C, and D denote each coefficient in a following expression (11). Specifically, the shape of the aspherical surface of the lens is expressed by the following expression provided that the direction of the optical axis 8 is taken as the Z axis, the direction orthogonal to the optical axis 8 as the X axis, the traveling direction of light is positive, k is the constant of cone, A, B, C, and D are the aspherical coefficients, and r is the curvature radius.

$$Z(X) = r^{-1}X^2 / \left[1 + \{1 - (k+1)r^{-2}X^2\}^{1/2}\right] + AX^4 + BX^6 + CX^8 + DX^{10} \quad (11)$$

In the following EXAMPLES, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, $-1.48E-1$ denotes $-1.48 \times 10^{-1}$.

First Example

Figure 2:
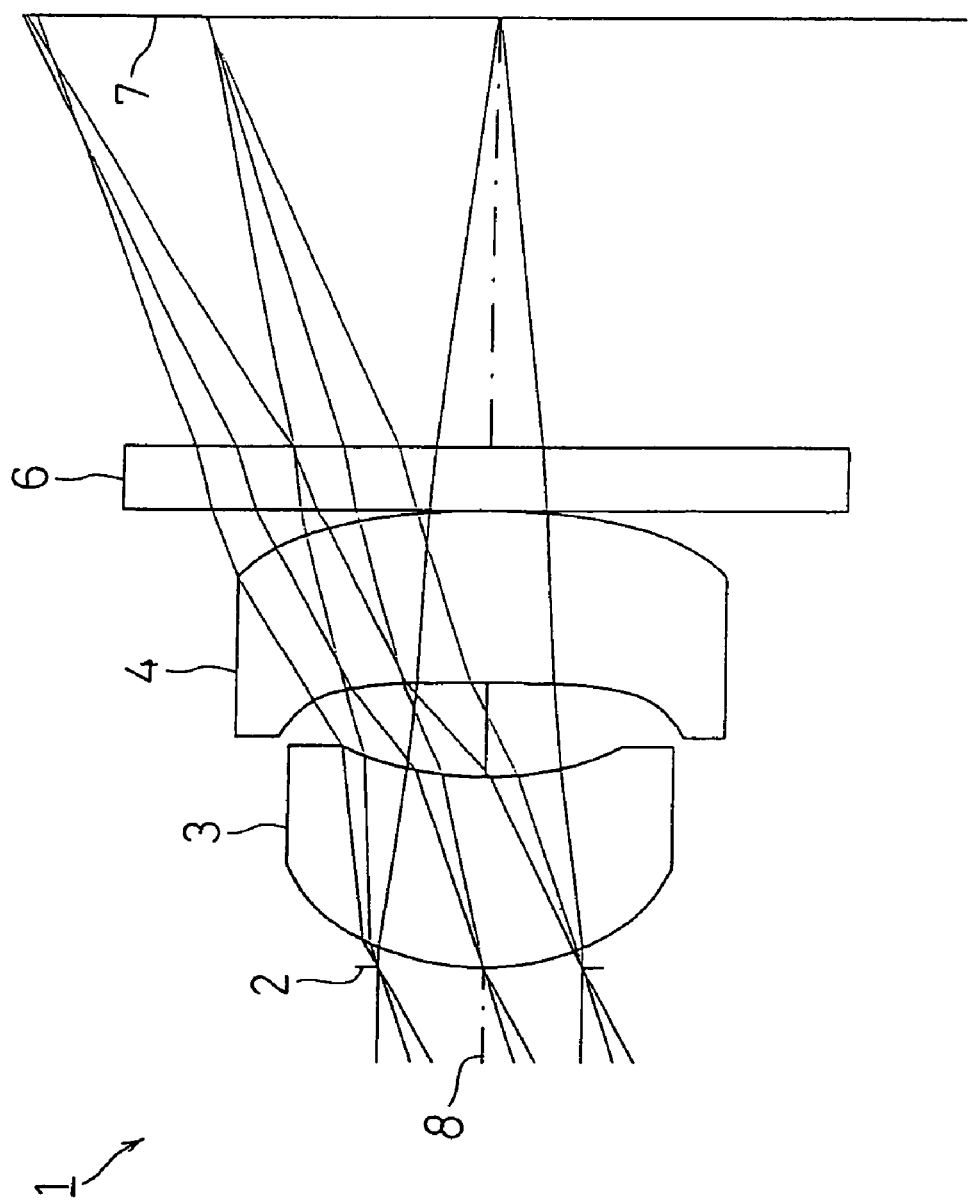
FIG. 2 is a schematic diagram for showing FIRST EXAMPLE of the imaging lens according to the present invention.

FIG. 2 shows a FIRST EXAMPLE of the present invention. In the FIRST EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the FIRST EXAMPLE was set under the following condition.

Lens Data

L = 4.34 mm, fl = 3.85 mm, $f_1$ = 5.18 mm, $f_2$ = 8.42 mm,
$d_1$ = 0.9 mm, $d_2$ = 0.44 mm, $d_3$ = 0.8 mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 1.270 | 0.90 | 1.531 | 56.0 |
| 3 (Second Face of First Lens) | 1.778 | 0.44 | | |
| 4 (First Face of Second Lens) | −57.143 | 0.80 | 1.531 | 56.0 |
| 5 (Second Face of Second Lens) | −4.167 | 0.00 | | |
| 6 (First Face of Cover Glass) | 0.000 | 0.30 | 1.516 | 64.0 |
| 7 (Second Face of Cover Glass) (Image Surface) | 0.000 | | | |

| Face Number | k | A | B | C | D |
|---|---|---|---|---|---|
| 2 | −1.48E−1 | 2.52E−2 | −1.56E−3 | −2.11E−1 | 5.05E−1 |
| 3 | −1.90 | 7.03E−2 | 8.47E−2 | 9.66E−2 | −1.61E−2 |
| 4 | −2.43E+5 | −2.31E−1 | 2.82E−1 | −3.96E−1 | 0 |
| 5 | −3.89E−1 | −3.44E−2 | −7.73E−2 | 8.63E−2 | −4.31E−2 |

Under such conditions, L/fl=1.13 was achieved, thereby satisfying the expression (1). $f_1/f_2$=0.62 was achieved, thereby satisfying the expression (2). $f_1$/fl=1.35 was achieved, thereby satisfying the expression (3). $d_2/d_1$=0.49 was achieved, thereby satisfying the expression (4). $d_1$/fl=0.23 was achieved, thereby satisfying the expression (5). $d_3$/fl=0.21 was achieved, thereby satisfying the expression (6). $f_2$/fl=2.19 was achieved, thereby satisfying the expression (7). S=0 mm was achieved, thereby satisfying the expression (8). Bfl/fl=0.57 was achieved, thereby satisfying the expression (9). Bfl=2.2 mm was achieved, thereby satisfying the expression (10).

Figure 3:
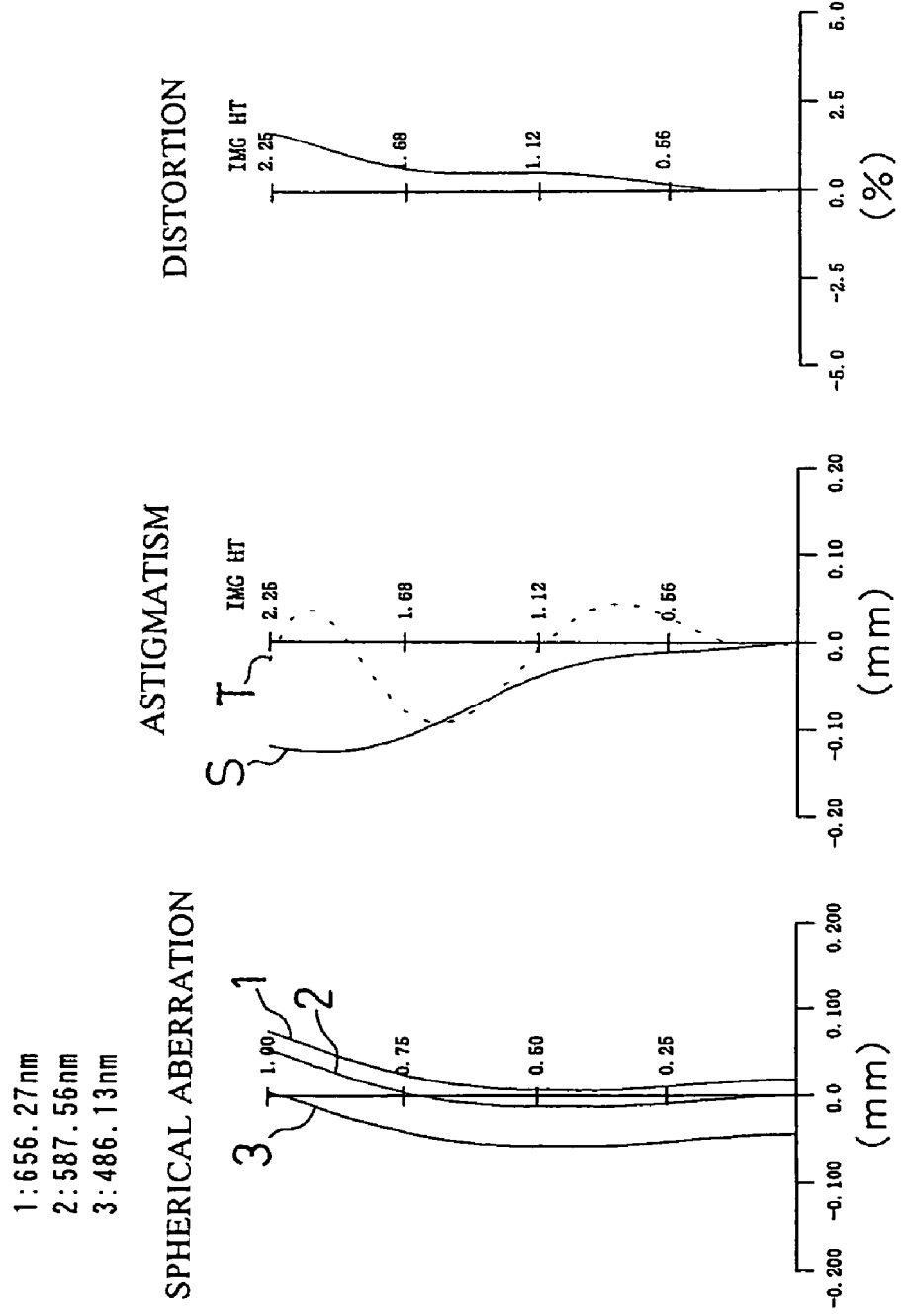
FIG. 3 shows graphs for describing the spherical aberration, astigmatism, and distortion of the imaging lens shown in FIG. 2.

FIG. 3 shows the spherical aberration, astigmatism, and distortion of the imaging lens 1 of the FIRST EXAMPLE.

According to the result, each of the spherical aberration, astigmatism, and distortion was almost satisfied. It can be seen from the result that a sufficient optical property can be obtained.

Second Example

Figure 4:
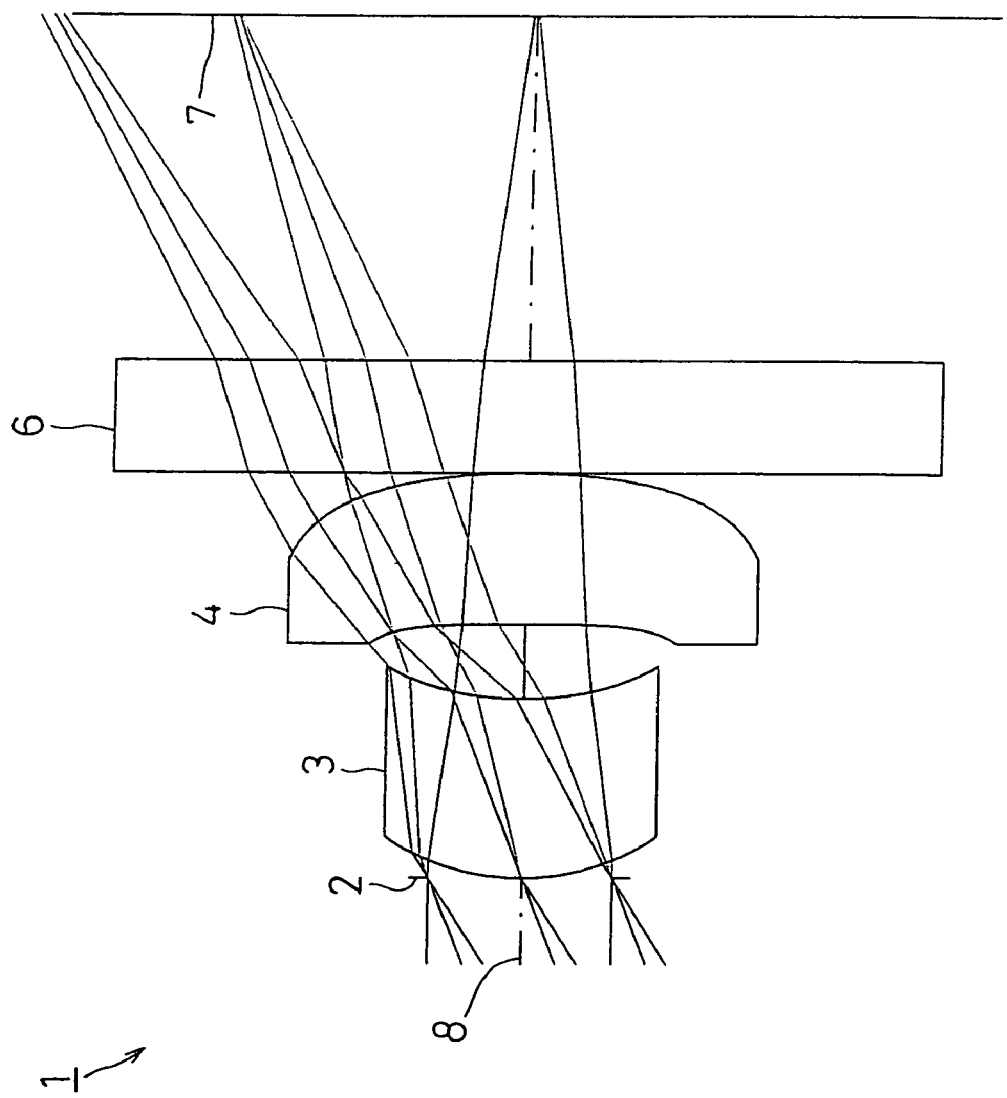
FIG. 4 is a schematic diagram for showing SECOND EXAMPLE of the imaging lens according to the present invention.

FIG. 4 shows a SECOND EXAMPLE of the present invention. In the SECOND EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the SECOND EXAMPLE was set under the following condition.

Lens Data

L = 2.19 mm, fl = 1.94 mm, $f_1$ = 2.7 mm, $f_2$ = 3.91 mm,
$d_1$ = 0.48 mm, $d_2$ = 0.2 mm, $d_3$ = 0.4 mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 0.645 | 0.48 | 1.531 | 56.0 |
| 3 (Second Face of First Lens) | 0.870 | 0.20 | | |

-continued

Lens Data

L = 2.19 mm, fl = 1.94 mm, $f_1$ = 2.7 mm, $f_2$ = 3.91 mm,
$d_1$ = 0.48 mm, $d_2$ = 0.2 mm, $d_3$ = 0.4 mm, F no = 4.0

| | | | | |
|---|---|---|---|---|
| 4 (First Face of Second Lens) | −50.000 | 0.40 | 1.531 | 56.0 |
| 5 (Second Face of Second Lens) | −2.000 | 0.00 | | |
| 6 (First Face of Cover Glass) | 0.000 | 0.30 | 1.516 | 64.0 |
| 7 (Second Face of Cover Glass) (Image Surface) | 0.000 | | | |

| Face Number | k | A | B | C | D |
|---|---|---|---|---|---|
| 2 | −1.48E−1 | 1.80E−1 | −4.24E−1 | −2.97E+1 | 2.78E+2 |
| 3 | −2.20 | 5.19E−1 | 2.43 | 1.23E+1 | −8.24 |
| 4 | −2.43E+5 | −1.80 | 8.68 | −5.13E+1 | 0 |
| 5 | −1.47 | −2.57E−1 | −2.36 | 1.10E+1 | −2.27E+1 |

Under such conditions, L/fl=1.13 was achieved, thereby satisfying the expression (1). $f_1/f_2$=0.69 was achieved, thereby satisfying the expression (2). $f_1$/fl=1.39 was achieved, thereby satisfying the expression (3). $d_2/d_1$=0.42 was achieved, thereby satisfying the expression (4). $d_1$/fl=0.25 was achieved, thereby satisfying the expression (5). $d_3$/fl=0.21 was achieved, thereby satisfying the expression (6). $f_2$/fl=2.02 was achieved, thereby satisfying the expression (7). S=0 mm was achieved, thereby satisfying the expression (8). Bfl/fl=0.57 was achieved, thereby satisfying the expression (9). Bfl=1.11 mm was achieved, thereby satisfying the expression (10).

Figure 5:
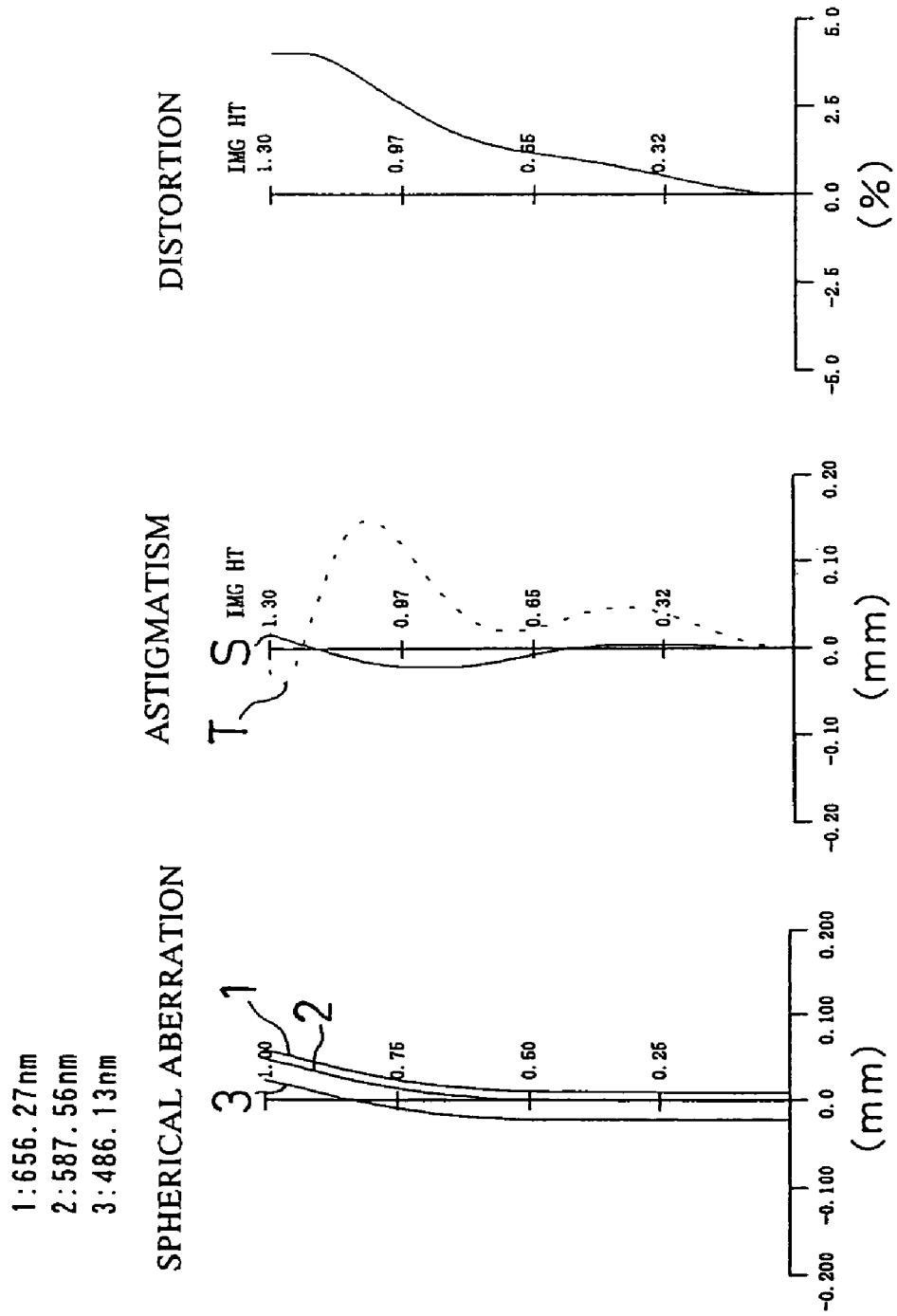
FIG. 5 shows graphs for describing the spherical aberration, astigmatism, and distortion of the imaging lens shown in FIG. 4.

FIG. 5 shows the spherical aberration, astigmatism, and distortion of the imaging lens 1 of the SECOND EXAMPLE.

According to the result, each of the spherical aberration, astigmatism, and distortion was almost satisfied. It can be seen from the result that a sufficient optical property can be obtained.

Third Example

Figure 6:
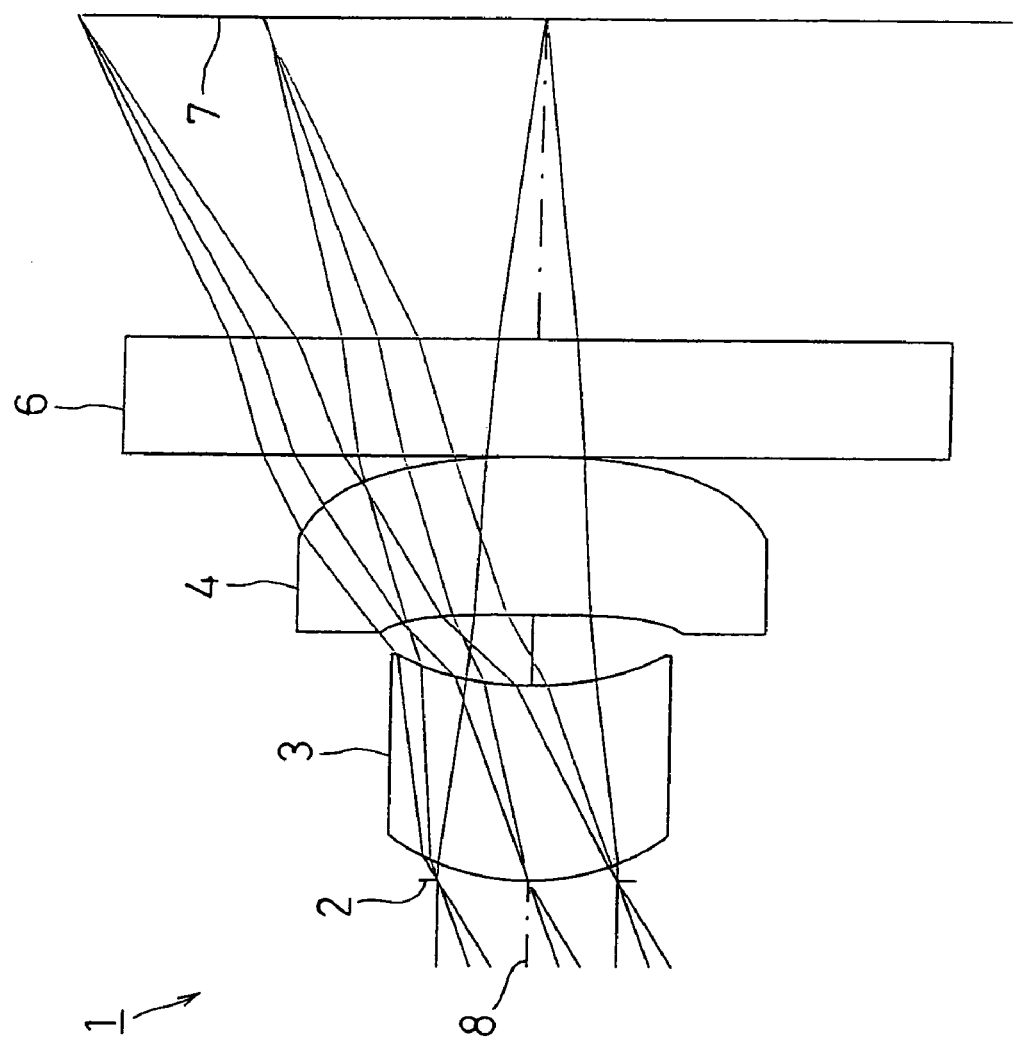
FIG. 6 is a schematic diagram for showing THIRD EXAMPLE of the imaging lens according to the present invention.

FIG. 6 shows a THIRD EXAMPLE of the present invention. In the THIRD EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the THIRD EXAMPLE was set under the following condition.

Lens Data

L = 2.09 mm, fl = 1.86 mm, $f_1$ = 2.37 mm, $f_2$ = 4.55 mm,
$d_1$ = 0.5 mm, $d_2$ = 0.18 mm, $d_3$ = 0.4 mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 0.625 | 0.50 | 1.525 | 56.0 |
| 3 (Second Face of First Lens) | 0.909 | 0.18 | | |
| 4 (First Face of Second Lens) | −20.000 | 0.40 | 1.525 | 56.0 |
| 5 (Second Face of Second Lens) | −2.151 | 0.00 | | |
| 6 (First Face of Cover Glass) | 0.000 | 0.30 | 1.516 | 64.0 |
| 7 (Second Face of Cover Glass) (Image Surface) | 0.000 | | | |

-continued

Lens Data

L = 2.09 mm, fl = 1.86 mm, $f_1$ = 2.37 mm, $f_2$ = 4.55 mm,
$d_1$ = 0.5 mm, $d_2$ = 0.18 mm, $d_3$ = 0.4 mm, F no = 4.0

| Face Number | k | A | B | C | D |
|---|---|---|---|---|---|
| 2 | −1.48E−1 | 1.81E−1 | −2.67E−1 | −2.74E+1 | 3.22E+2 |
| 3 | −1.72 | 5.93E−1 | 2.97 | 1.23E+1 | −8.24 |
| 4 | −2.43E+5 | −1.86 | 7.95 | −5.31E+1 | 0 |
| 5 | 7.93E−1 | −2.85E−1 | −2.43 | 1.05E+1 | −2.38E+1 |

Under such conditions, L/fl=1.12 was achieved, thereby satisfying the expression (1). $f_1/f_2$=0.52 was achieved, thereby satisfying the expression (2). $f_1$/fl=1.27 was achieved, thereby satisfying the expression (3). $d_2/d_1$=0.36 was achieved, thereby satisfying the expression (4). $d_1$/fl=0.27 was achieved, thereby satisfying the expression (5). $d_3$/fl=0.22 was achieved, thereby satisfying the expression (6). $f_2$/fl=2.45 was achieved, thereby satisfying the expression (7). S=0 mm was achieved, thereby satisfying the expression (8). Bfl/fl=0.54 was achieved, thereby satisfying the expression (9). Bfl=1.01 mm was achieved, thereby satisfying the expression (10).

Figure 7:
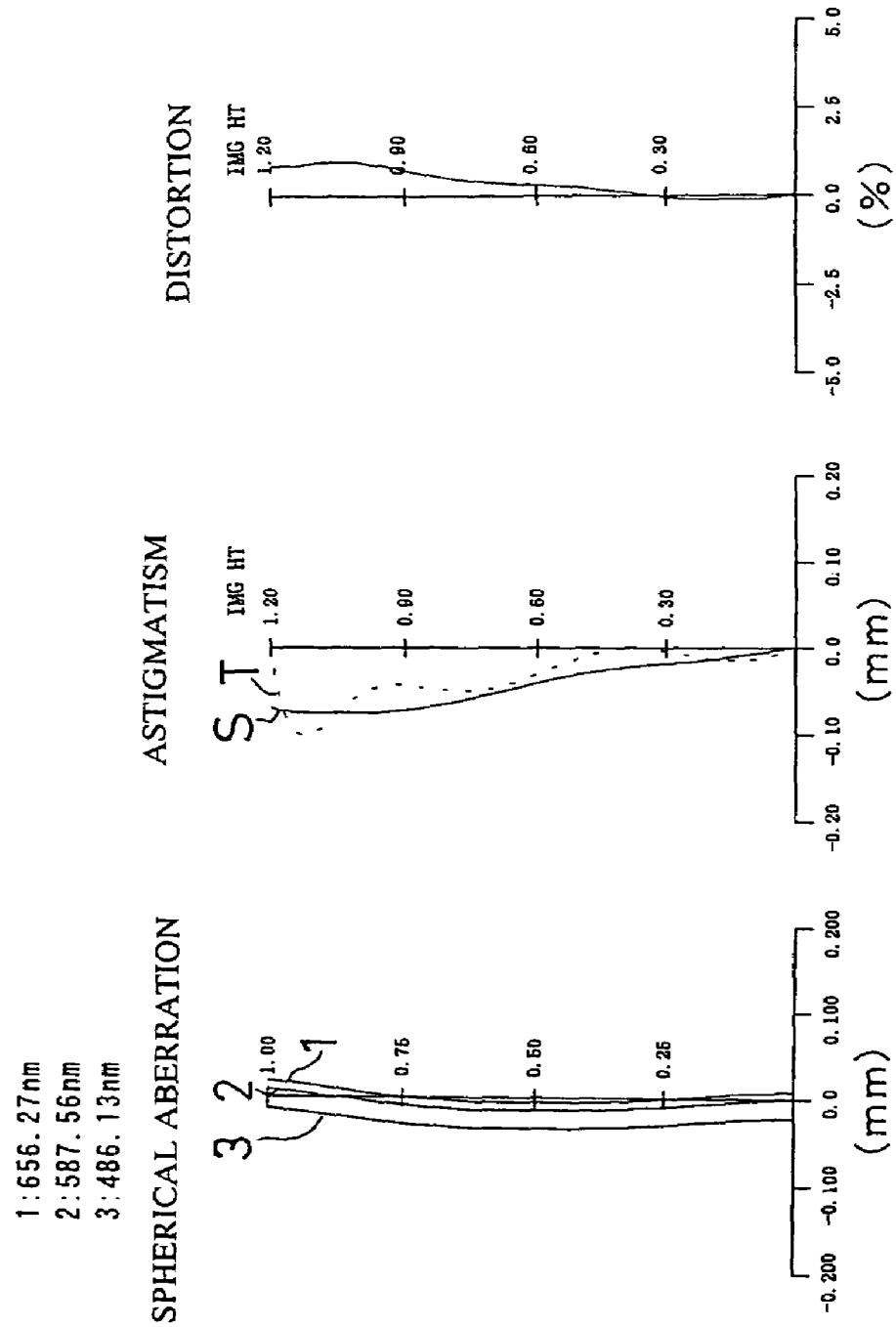
FIG. 7 shows graphs for describing the spherical aberration, astigmatism, and distortion of the imaging lens shown in FIG. 6.

FIG. 7 shows the spherical aberration, astigmatism, and distortion of the imaging lens 1 of the THIRD EXAMPLE.

According to the result, each of the spherical aberration, astigmatism, and distortion was almost satisfied. It can be seen from the result that a sufficient optical property can be obtained.

Fourth Example

Figure 8:
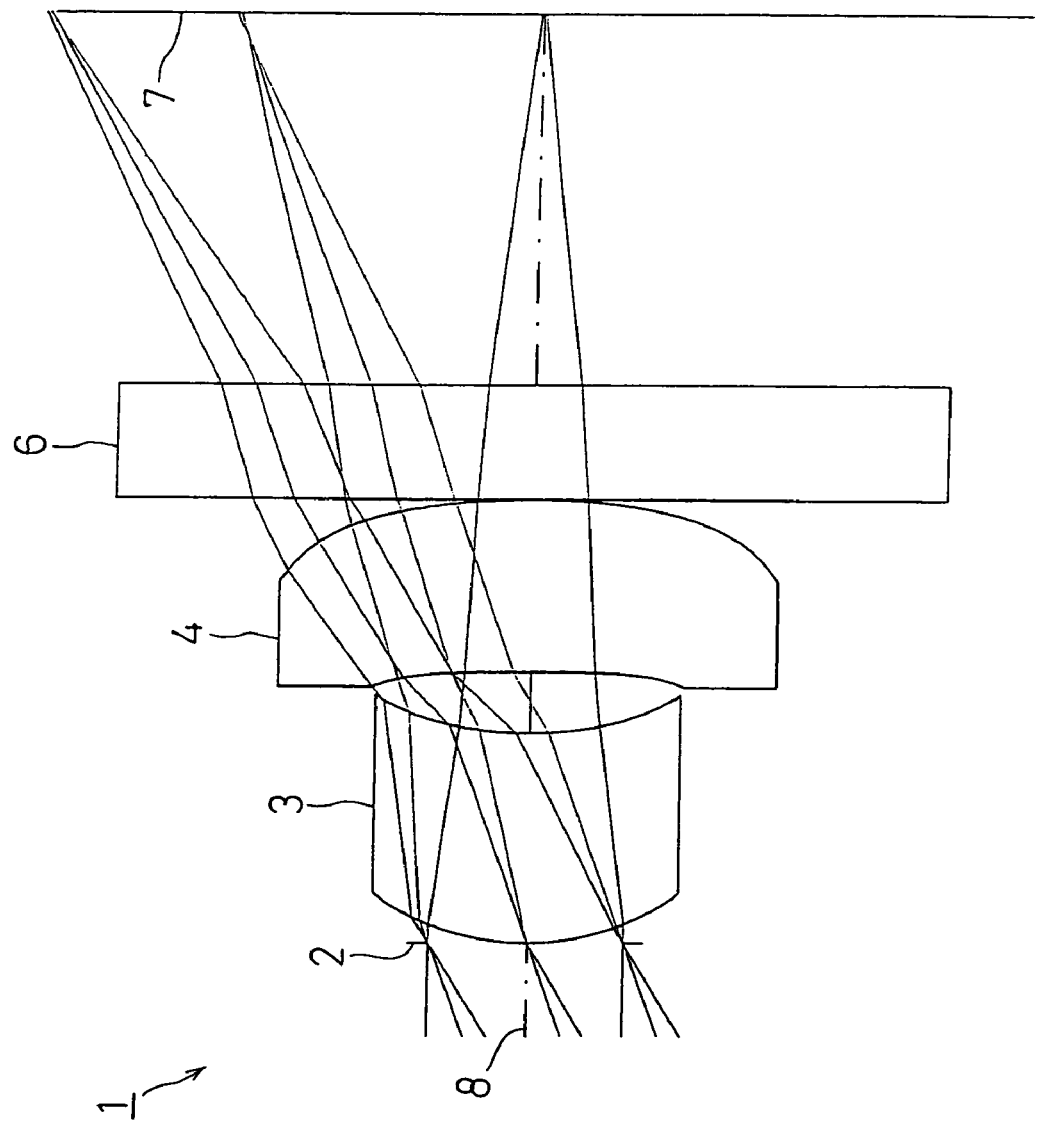
FIG. 8 is a schematic diagram for showing FOURTH EXAMPLE of the imaging lens according to the present invention.

FIG. 8 shows a FOURTH EXAMPLE of the present invention. In the FOURTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the FOURTH EXAMPLE was set under the following condition.

Lens Data

L = 2.32 mm, fl = 2.06 mm, $f_1$ = 2.74 mm, $f_2$ = 4.63 mm,
$d_1$ = 0.55 mm, $d_2$ = 0.16 mm, $d_3$ = 0.45 mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 0.699 | 0.55 | 1.531 | 56.0 |
| 3 (Second Face of First Lens) | 0.980 | 0.16 | | |
| 4 (First Face of Second Lens) | −33.333 | 0.45 | 1.531 | 56.0 |
| 5 (Second Face of Second Lens) | −2.299 | 0.00 | | |
| 6 (First Face of Cover Glass) | 0.000 | 0.30 | 1.516 | 64.0 |
| 7 (Second Face of Cover Glass) (Image Surface) | 0.000 | | | |

| Face Number | k | A | B | C | D |
|---|---|---|---|---|---|
| 2 | −1.48E−1 | 1.36E−1 | −1.66E−1 | −1.41E+1 | 1.36E+2 |
| 3 | −1.72 | 4.45E−1 | 1.85 | 6.34 | −3.49 |

-continued

Lens Data

L = 2.32 mm, fl = 2.06 mm, f$_1$ = 2.74 mm, f$_2$ = 4.63 mm,
d$_1$ = 0.55 mm, d$_2$ = 0.16 mm, d$_3$ = 0.45 mm, F no = 4.0

| | | | | |
|---|---|---|---|---|
| 4 | −2.43E+5 | −1.40 | 4.93 | −2.72E+1 | 0 |
| 5 | 7.93E−1 | −2.14E−1 | −1.51 | 5.39 | −1.01E+1 |

Under such conditions, L/fl=1.13 was achieved, thereby satisfying the expression (1). f$_1$/f$_2$=0.59 was achieved, thereby satisfying the expression (2). f$_1$/fl=1.33 was achieved, thereby satisfying the expression (3). d$_2$/d$_1$=0.29 was achieved, thereby satisfying the expression (4). d$_1$/fl=0.27 was achieved, thereby satisfying the expression (5). d$_3$/fl=0.22 was achieved, thereby satisfying the expression (6). f$_2$/fl=2.25 was achieved, thereby satisfying the expression (7). S=0 mm was achieved, thereby satisfying the expression (8). Bfl/fl=0.56 was achieved, thereby satisfying the expression (9). Bfl=1.16 mm was achieved, thereby satisfying the expression (10).

Figure 9:
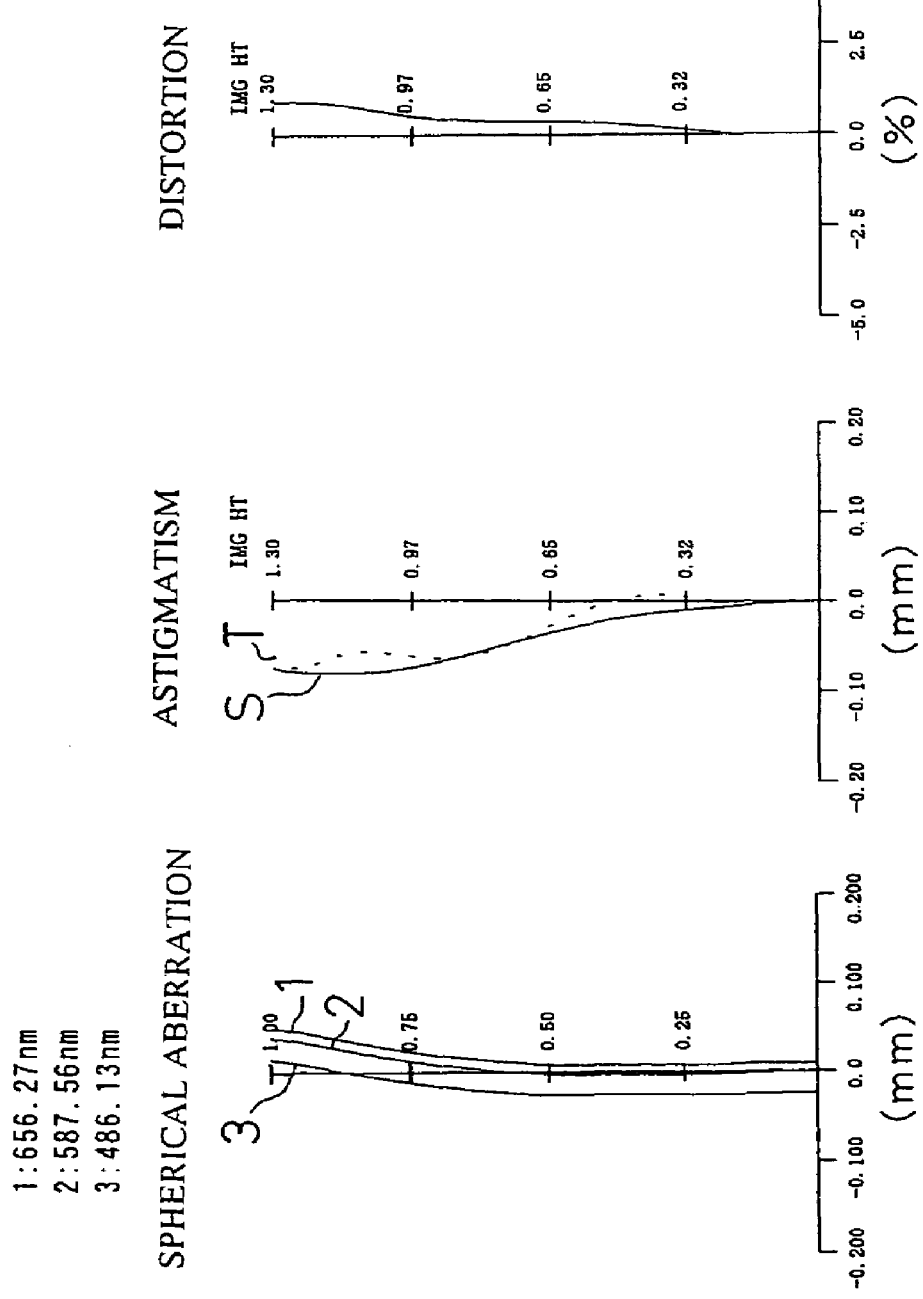
FIG. 9 shows graphs for describing the spherical aberration, astigmatism, and distortion of the imaging lens shown in FIG. 8.

FIG. 9 shows the spherical aberration, astigmatism, and distortion of the imaging lens 1 of the FOURTH EXAMPLE.

According to the result, each of the spherical aberration, astigmatism, and distortion was almost satisfied. It can be seen from the result that a sufficient optical property can be obtained.

Fifth Example

Figure 10:
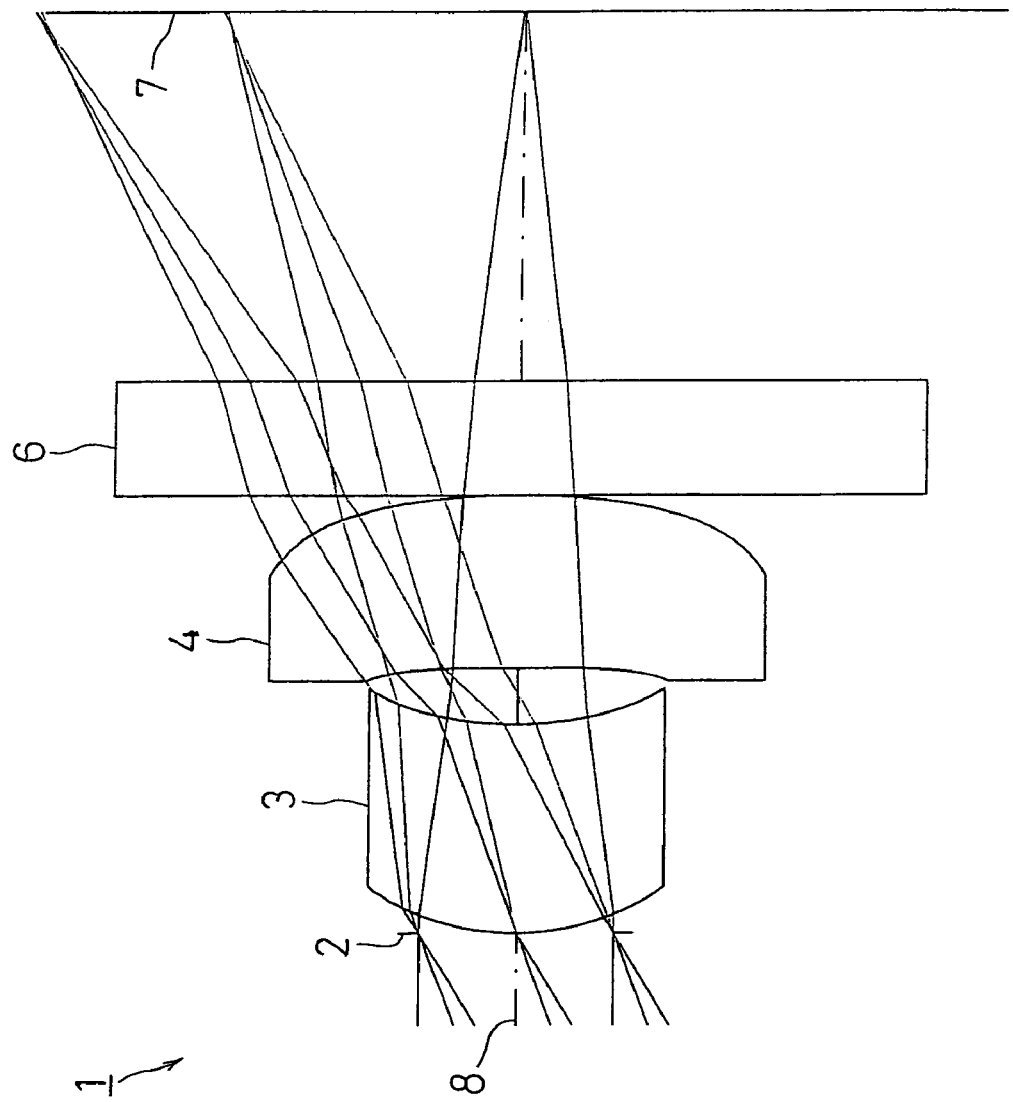
FIG. 10 is a schematic diagram for showing FIFTH EXAMPLE of the imaging lens according to the present invention.

FIG. 10 shows a FIFTH EXAMPLE of the present invention. In the FIFTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the FIFTH EXAMPLE was set under the following condition.

Lens Data

L = 2.31 mm, fl = 2.05 mm, f$_1$ = 2.72 mm, f$_2$ = 4.61 mm,
d$_1$ = 0.55 mm, d$_2$ = 0.15 mm, d$_3$ = 0.45 mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 0.698 | 0.55 | 1.531 | 56.0 |
| 3 (Second Face of First Lens) | 0.978 | 0.15 | | |
| 4 (First Face of Second Lens) | −31.429 | 0.45 | 1.531 | 56.0 |
| 5 (Second Face of Second Lens) | −2.292 | 0.00 | | |
| 6 (First Face of Cover Glass) | 0.000 | 0.30 | 1.518 | 64.0 |
| 7 (Second Face of Cover Glass) (Image Surface) | 0.000 | | | |

| Face Number | k | A | B | C | D |
|---|---|---|---|---|---|
| 2 | −1.48E−1 | 1.43E−1 | −1.26E−1 | −1.38E+1 | 1.38E+2 |
| 3 | −1.73 | 4.44E−1 | 1.86 | 6.34 | −3.49 |
| 4 | −2.43E+5 | −1.41 | 4.79 | −2.81E+1 | 0 |
| 5 | −8.26E−1 | −1.94E−1 | −1.49 | 5.34 | −1.02E+1 |

Under such conditions, L/fl=1.13 was achieved, thereby satisfying the expression (1). f$_1$/f$_2$=0.59 was achieved, thereby satisfying the expression (2). f$_1$/fl=1.33 was achieved, thereby satisfying the expression (3). d$_2$/d$_1$=0.27 was achieved, thereby satisfying the expression (4). d$_1$/fl=0.27 was achieved, thereby satisfying the expression (5). d$_3$/fl=0.22 was achieved, thereby satisfying the expression (6). f$_2$/fl=2.25 was achieved, thereby satisfying the expression (7). S=0 mm was achieved, thereby satisfying the expression (8). Bfl/fl=0.57 was achieved, thereby satisfying the expression (9). Bfl=1.16 mm was achieved, thereby satisfying the expression (10).

Figure 11:
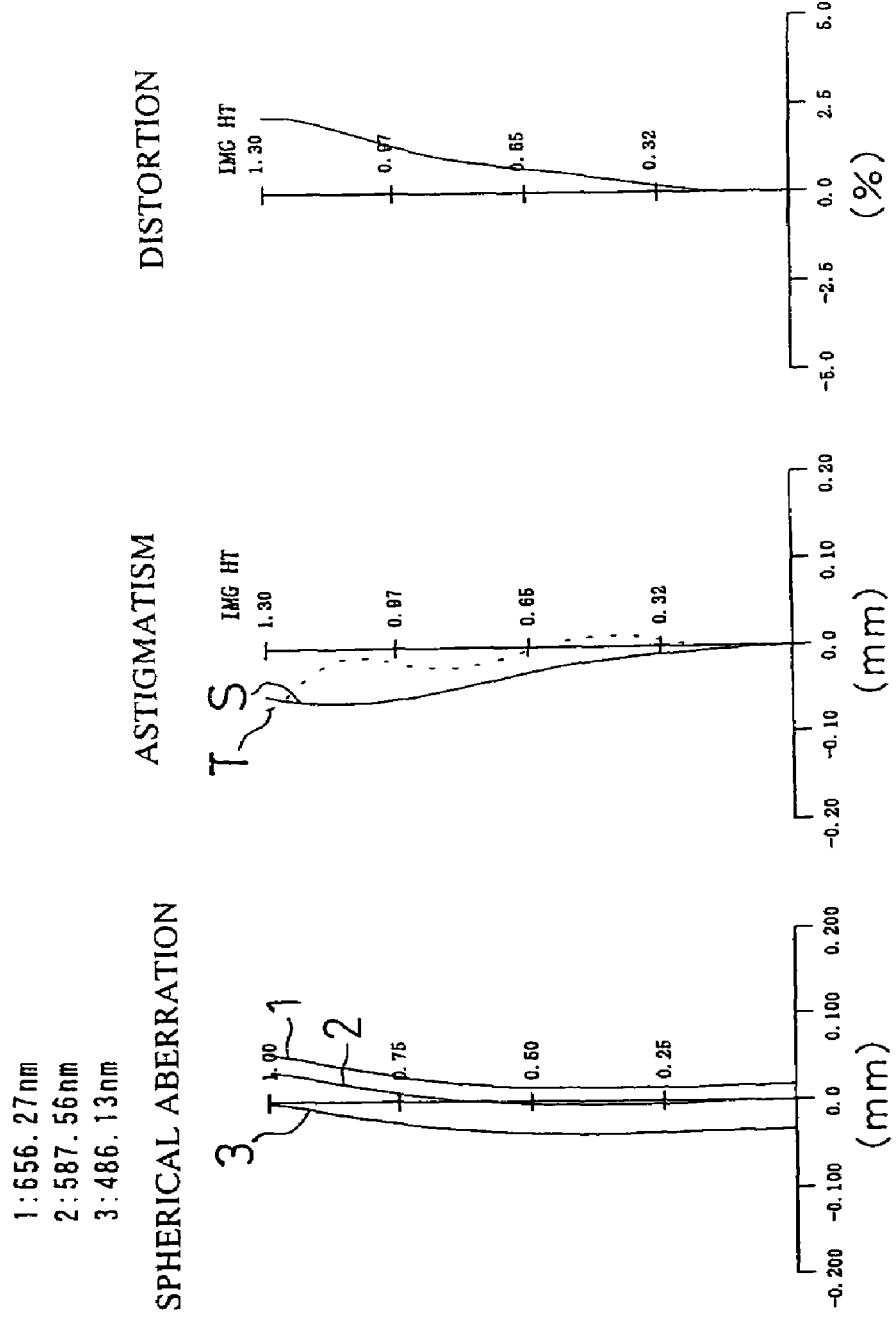
FIG. 11 shows graphs for describing the spherical aberration, astigmatism, and distortion of the imaging lens shown in FIG. 10.

FIG. 11 shows the spherical aberration, astigmatism, and distortion of the imaging lens 1 of the FIFTH EXAMPLE.

According to the result, each of the spherical aberration, astigmatism, and distortion was almost satisfied. It can be seen from the result that a sufficient optical property can be obtained.

Sixth Example

Figure 12:
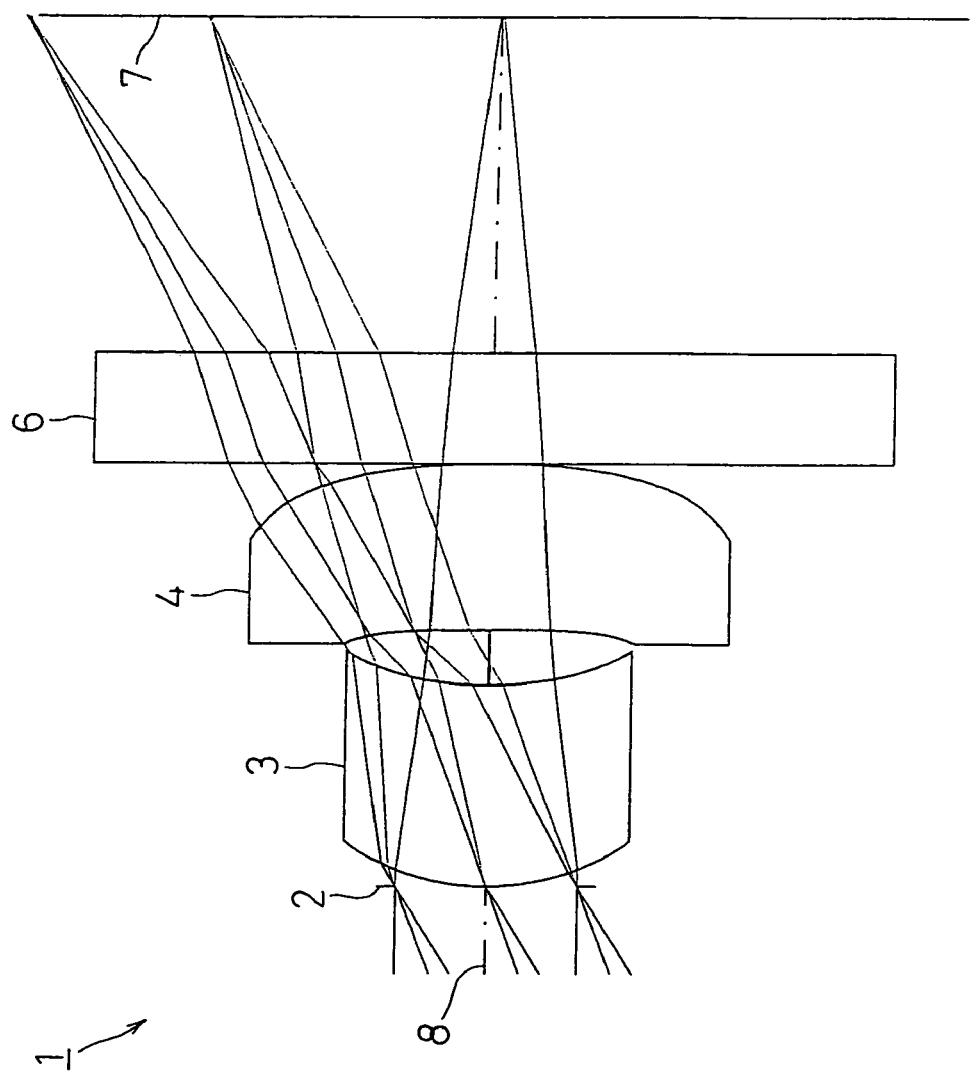
FIG. 12 is a schematic diagram for showing SIXTH EXAMPLE of the imaging lens according to the present invention.

FIG. 12 shows a SIXTH EXAMPLE of the present invention. In the SIXTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the SIXTH EXAMPLE was set under the following condition.

Lens Data

L = 2.26 mm, fl = 1.99 mm, f$_1$ = 2.59 mm, f$_2$ = 4.68 mm,
d$_1$ = 0.55 mm, d$_2$ = 0.15 mm, d$_3$ = 0.45 mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 0.690 | 0.55 | 1.531 | 56.0 |
| 3 (Second Face of First Lens) | 1.000 | 0.15 | | |
| 4 (First Face of Second Lens) | −33.333 | 0.45 | 1.531 | 56.0 |
| 5 (Second Face of Second Lens) | −2.326 | 0.00 | | |
| 6 (First Face of Cover Glass) | 0.000 | 0.30 | 1.516 | 64.0 |
| 7 (Second Face of Cover Glass) (Image Surface) | 0.000 | | | |

| Face Number | k | A | B | C | D |
|---|---|---|---|---|---|
| 2 | −1.48E−1 | 1.47E−1 | −1.49E−1 | −1.40E+1 | 1.38E+2 |
| 3 | −1.71 | 4.46E−1 | 1.86 | 6.34 | −3.49 |
| 4 | −2.43E+5 | −1.44 | 4.59 | −3.00E+1 | 0 |
| 5 | −5.22E−1 | −1.97E−1 | −1.50 | 5.30 | −1.00E+1 |

Under such conditions, L/fl=1.14 was achieved, thereby satisfying the expression (1). f$_1$/f$_2$=0.55 was achieved, thereby satisfying the expression (2). f$_1$/fl=1.30 was achieved, thereby satisfying the expression (3). d$_2$/d$_1$=0.27 was achieved, thereby satisfying the expression (4). d$_1$/fl=0.28 was achieved, thereby satisfying the expression (5). d$_3$/fl=0.23 was achieved, thereby satisfying the expression (6). f$_2$/fl=2.35 was achieved, thereby satisfying the expression (7). S=0 mm was achieved, thereby satisfying the expression (8). Bfl/fl=0.56 was achieved, thereby satisfying the expression (9). Bfl=1.11 mm was achieved, thereby satisfying the expression (10).

Figure 13:
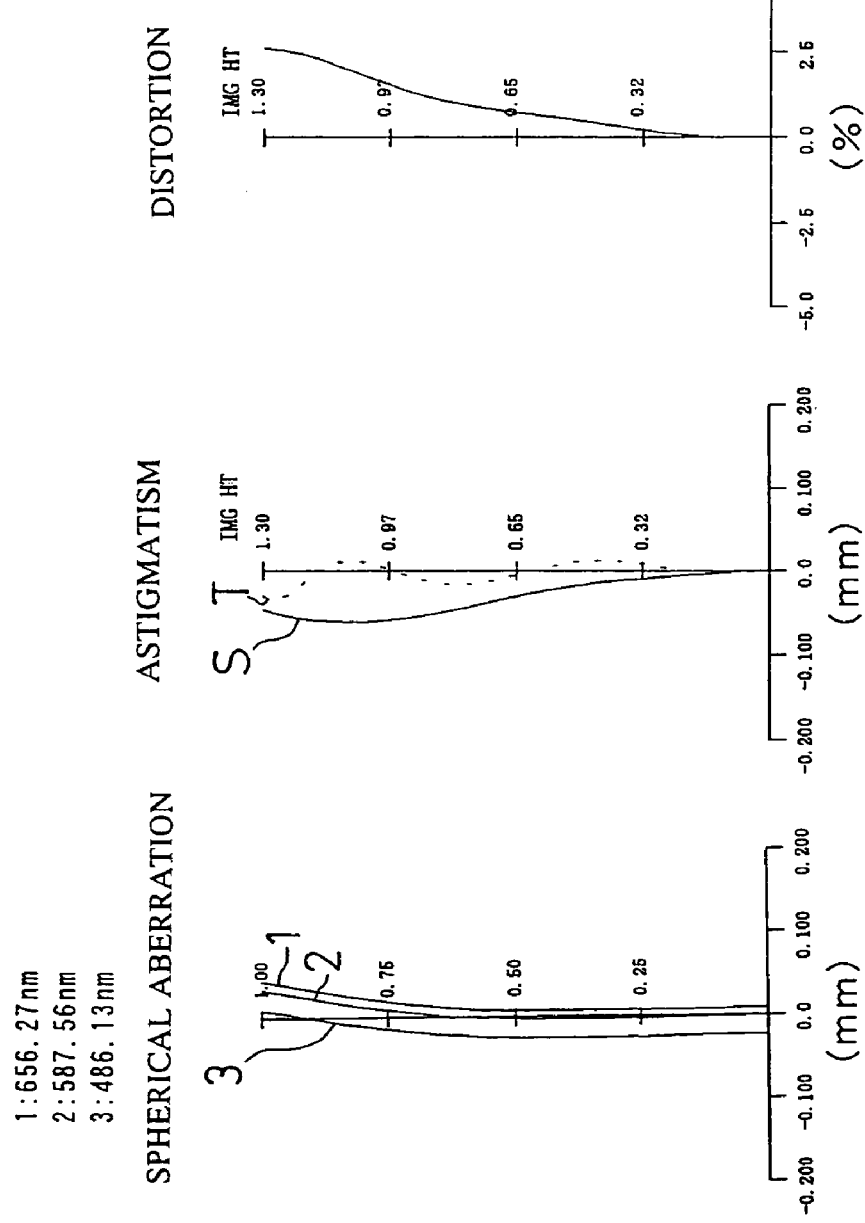
FIG. 13 shows graphs for describing the spherical aberration, astigmatism, and distortion of the imaging lens shown in FIG. 12.

FIG. 13 shows the spherical aberration, astigmatism, and distortion of the imaging lens 1 of the SIXTH EXAMPLE.

According to the result, each of the spherical aberration, astigmatism, and distortion was almost satisfied. It can be seen from the result that a sufficient optical property can be obtained.

Seventh Example

Figure 14:
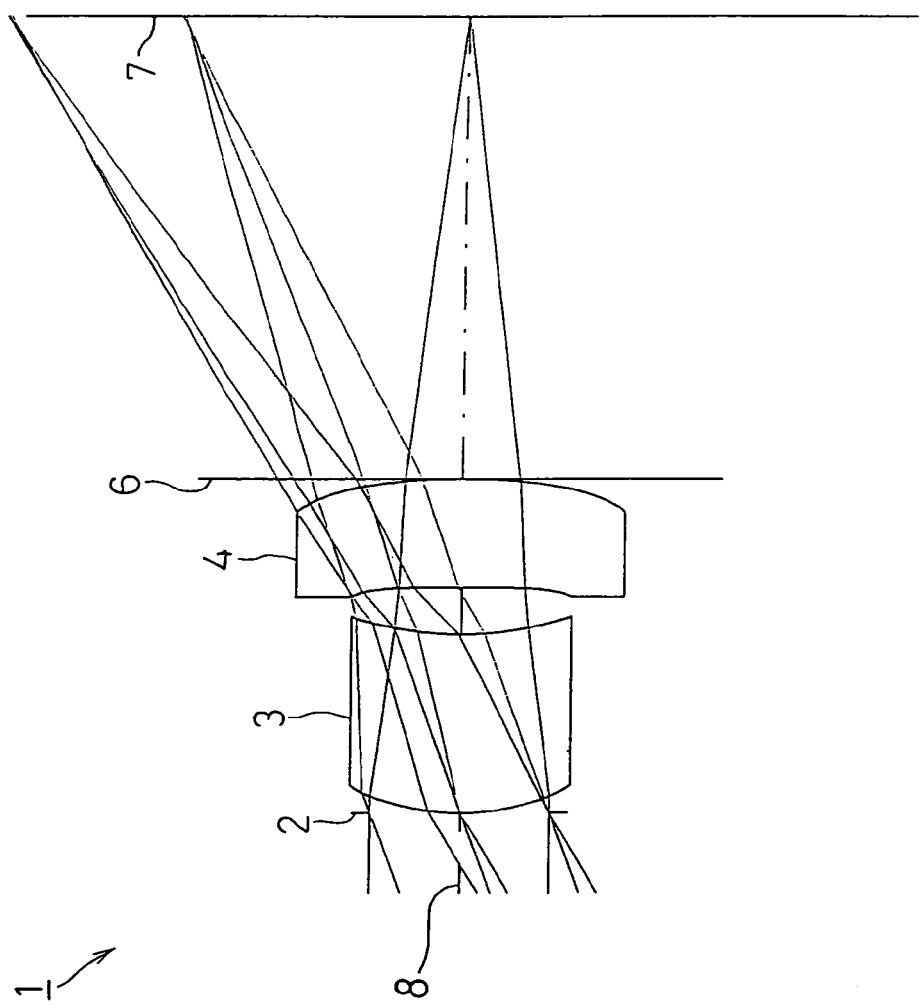
FIG. 14 is a schematic diagram for showing SEVENTH EXAMPLE of the imaging lens according to the present invention.

FIG. 14 shows a SEVENTH EXAMPLE of the present invention. In the SEVENTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the SEVENTH EXAMPLE was set under the following condition.

Lens Data $L = 2.22$ mm, fl = 2.02 mm, $f_1 = 2.8$ mm, $f_2 = 4.56$ mm,
$d_1 = 0.5$ mm, $d_2 = 0.13$ mm, $d_3 = 0.3$ mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 0.697 | 0.50 | 1.531 | 56.0 |
| 3 (Second Face of First Lens) | 0.980 | 0.13 | | |
| 4 (First Face of Second Lens) | −33.333 | 0.30 | 1.531 | 56.0 |
| 5 (Second Face of Second Lens) | −2.273 | 0.00 | | |
| 6 (Image Surface) | 0.000 | | | |

| Face Number | k | A | B | C | D |
|---|---|---|---|---|---|
| 2 | −1.48E−1 | 8.29E−1 | −2.16E+1 | −6.43E+1 | 2.94E+3 |
| 3 | 7.25 | −4.40E−1 | −1.75E+1 | 6.34 | −3.49 |
| 4 | −2.43E+5 | −2.07 | 1.55E+1 | −2.28E+2 | 0 |
| 5 | 9.31 | −7.29E−1 | 4.99 | −3.47E+1 | 4.31E+1 |

Under such conditions, L/fl=1.10 was achieved, thereby satisfying the expression (1). $f_1/f_2$=0.61 was achieved, thereby satisfying the expression (2). $f_1$/fl=1.39 was achieved, thereby satisfying the expression (3). $d_2/d_1$=0.26 was achieved, thereby satisfying the expression (4). $d_1$/fl=0.25 was achieved, thereby satisfying the expression (5). $d_3$/fl=0.15 was achieved, thereby satisfying the expression (6). $f_2$/fl=2.26 was achieved, thereby satisfying the expression (7). S=0 mm was achieved, thereby satisfying the expression (8). Bfl/fl=0.64 was achieved, thereby satisfying the expression (9). Bfl=1.29 mm was achieved, thereby satisfying the expression (10).

Figure 15:
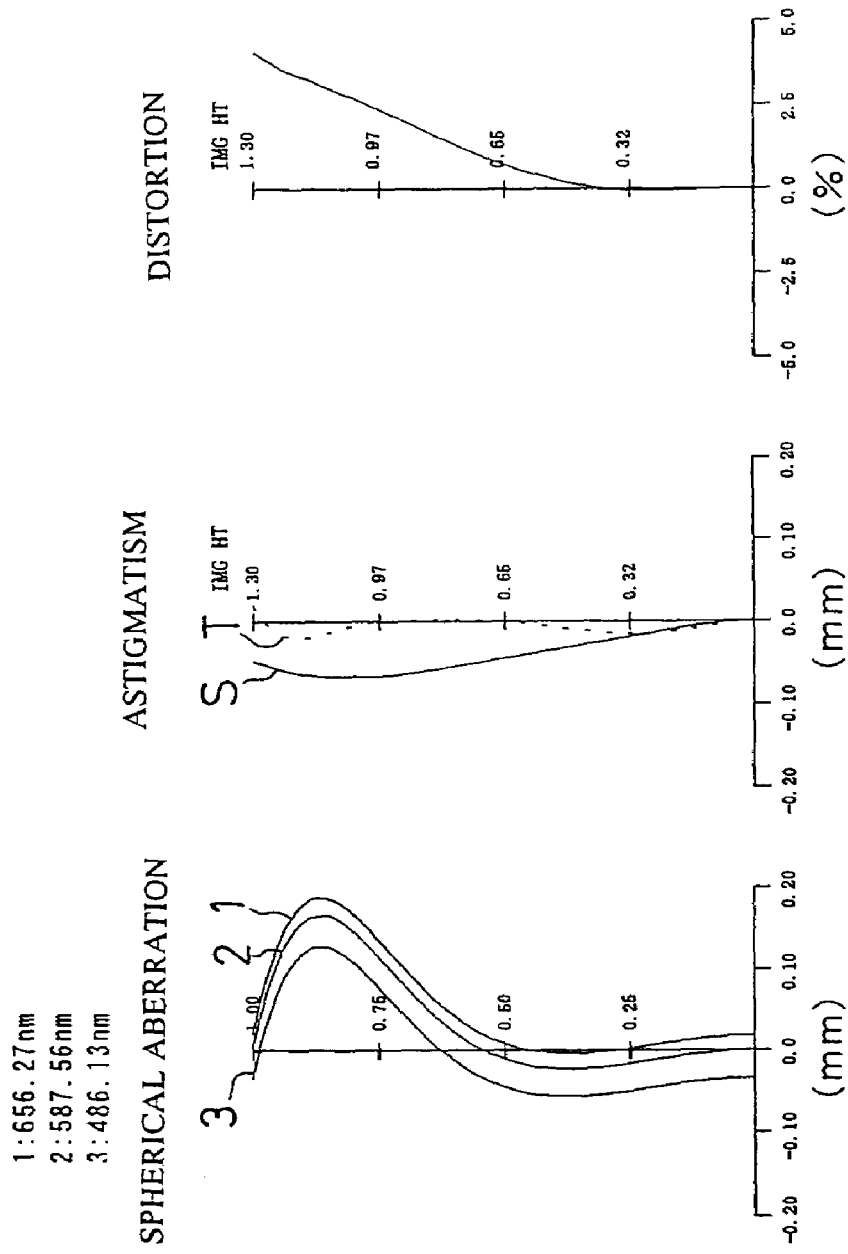
FIG. 15 shows graphs for describing the spherical aberration, astigmatism, and distortion of the imaging lens shown in FIG. 14.

FIG. 15 shows the spherical aberration, astigmatism, and distortion of the imaging lens 1 of the SEVENTH EXAMPLE.

According to the result, each of the spherical aberration, astigmatism, and distortion was almost satisfied. It can be seen from the result that a sufficient optical property can be obtained.

Eighth Example

Figure 16:
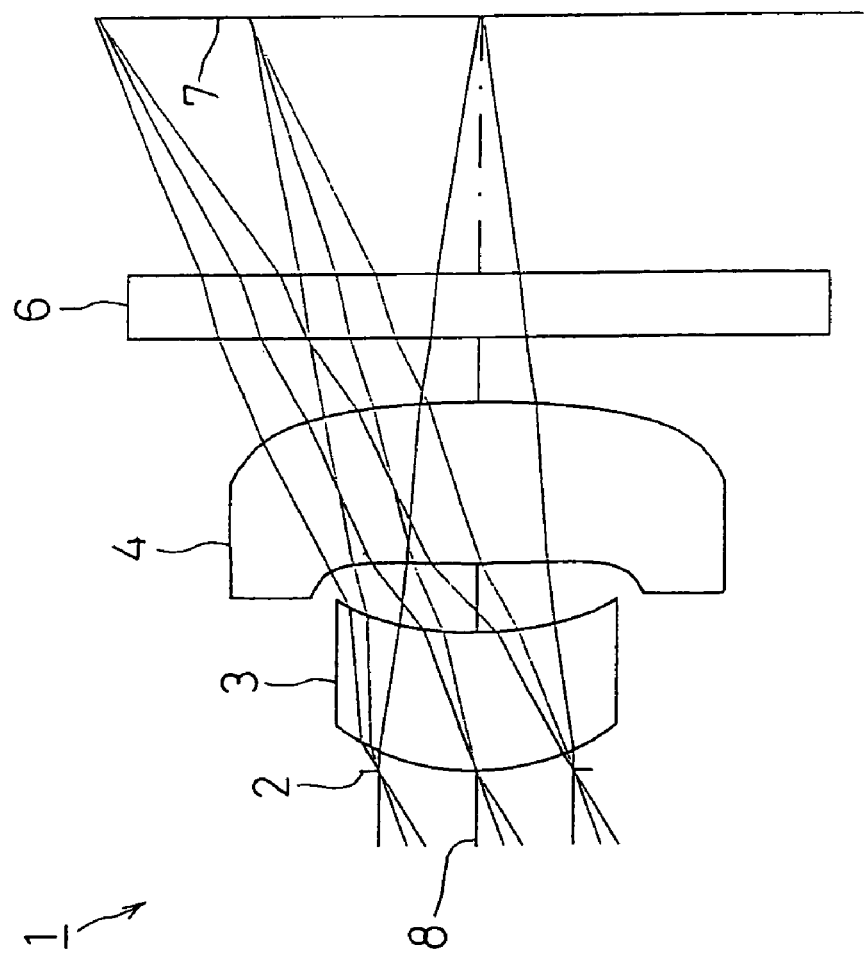
FIG. 16 is a schematic diagram for showing EIGHTH EXAMPLE of the imaging lens according to the present invention.

FIG. 16 shows an EIGHTH EXAMPLE of the present invention. In the EIGHTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the EIGHTH EXAMPLE was set under the following condition.

Lens Data $L = 3.41$ mm, fl = 2.9 mm, $f_1 = 4.36$ mm, $f_2 = 5.6$ mm,
$d_1 = 0.65$ mm, $d_2 = 0.32$ mm, $d_3 = 0.75$ mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 1.087 | 0.65 | 1.531 | 56.0 |
| 3 (Second Face of First Lens) | 1.622 | 0.32 | | |
| 4 (First Face of Second Lens) | 7.906 | 0.75 | 1.531 | 56.0 |
| 5 (Second Face of Second Lens) | −4.613 | 0.30 | | |
| 6 (First Face of Cover Glass) | 0.000 | 0.30 | 1.516 | 64.0 |
| 7 (Second Face of Cover Glass) | 0.000 | | | |
| (Image Surface) | | | | |

| Face Number | k | A | B | C | D |
|---|---|---|---|---|---|
| 2 | −1.83 | 8.88E−2 | 5.02E−1 | −9.42E−1 | 1.01 |
| 3 | −3.19E−1 | 1.64E−2 | 4.04E−1 | −1.56 | 3.03 |
| 4 | −7.93 | −1.92E−1 | 2.08E−1 | −2.01 | 6.02 |
| 5 | −4.97E−2 | −2.50E−2 | −1.14E−2 | −5.94E−2 | 7.13E−2 |

Under such conditions, L/fl=1.18 was achieved, thereby satisfying the expression (1). $f_1/f_2$=0.78 was achieved, thereby satisfying the expression (2). $f_1$/fl=1.50 was achieved, thereby satisfying the expression (3). $d_2/d_1$=0.49 was achieved, thereby satisfying the expression (4). $d_1$/fl=0.22 was achieved, thereby satisfying the expression (5). $d_3$/fl=0.26 was achieved, thereby satisfying the expression (6). $f_2$/fl=1·93 was achieved, thereby satisfying the expression (7). S=0 mm was achieved, thereby satisfying the expression (8). Bfl/fl=0.58 was achieved, thereby satisfying the expression (9). Bfl=1.69 mm was achieved, thereby satisfying the expression (10).

Figure 17:
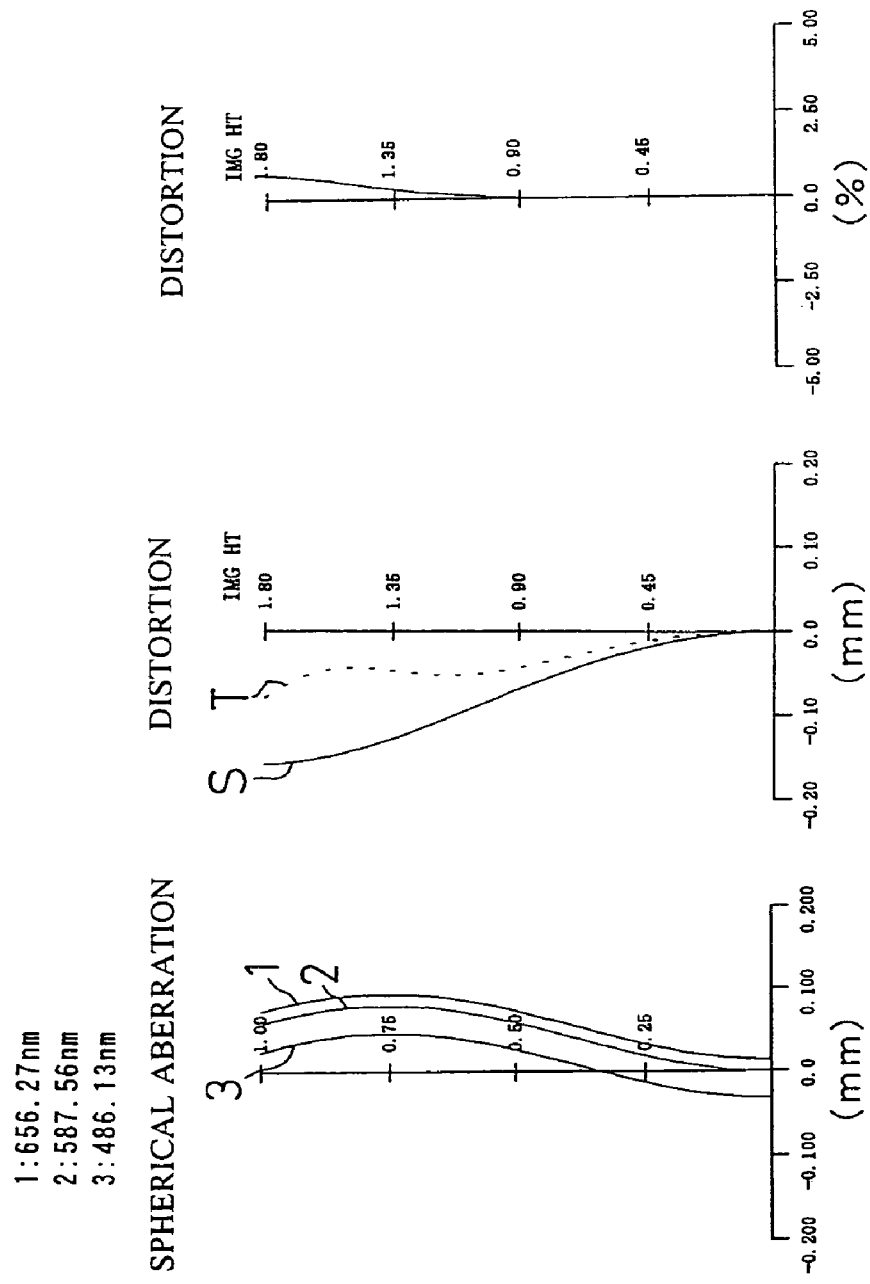
FIG. 17 shows graphs for describing the spherical aberration, astigmatism, and distortion of the imaging lens shown in FIG. 16.

FIG. 17 shows the spherical aberration, astigmatism, and distortion of the imaging lens 1 of the EIGHTH EXAMPLE.

According to the result, each of the spherical aberration, astigmatism, and distortion was almost satisfied. It can be seen from the result that a sufficient optical property can be obtained.

Ninth Example

Figure 18:
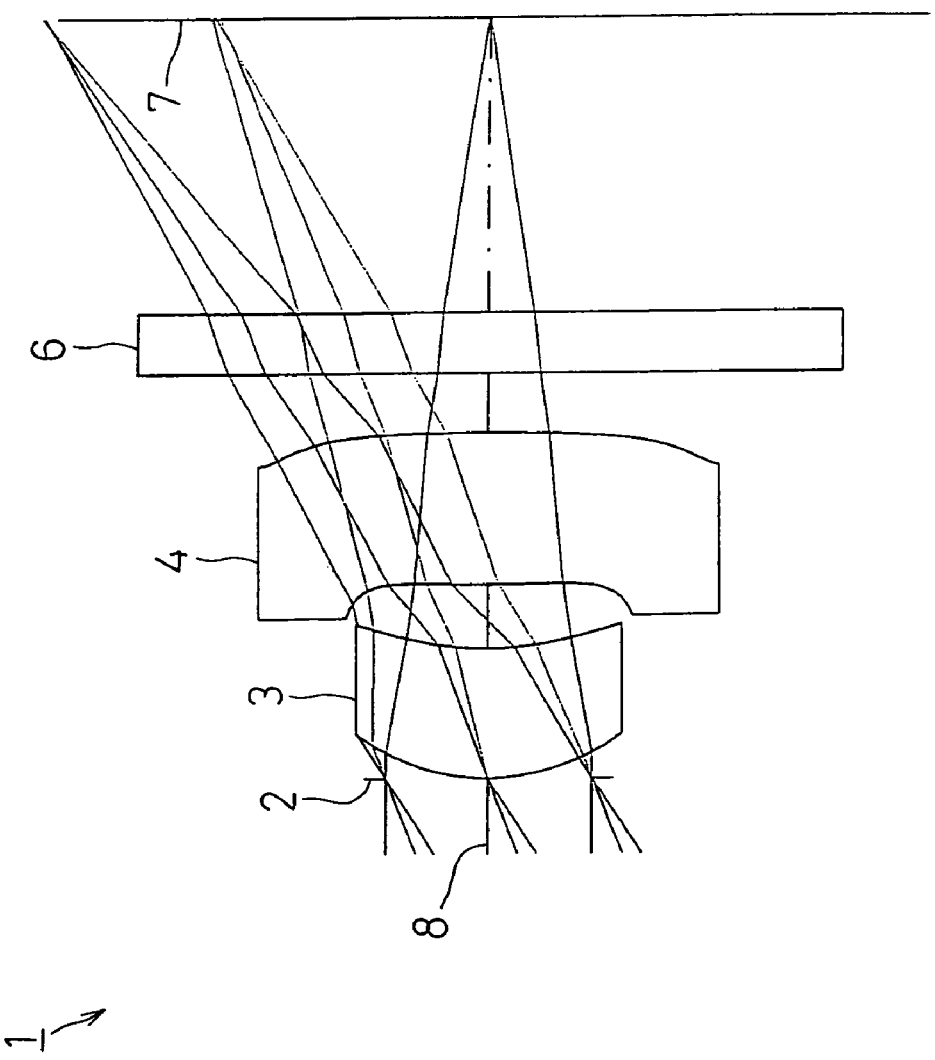
FIG. 18 is a schematic diagram for showing NINTH EXAMPLE of the imaging lens according to the present invention.

FIG. 18 shows a NINTH EXAMPLE of the present invention. In the NINTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the NINTH EXAMPLE was set under the following condition.

Lens Data

L = 3.70 mm, fl = 3.39 mm, $f_1$ = 4.36 mm, $f_2$ = 10.44 mm,
$d_1$ = 0.65 mm, $d_2$ = 0.32 mm, $d_3$ = 0.75 mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 1.087 | 0.65 | 1.531 | 56.0 |
| 3 (Second Face of First Lens) | 1.622 | 0.32 | | |
| 4 (First Face of Second Lens) | 7.906 | 0.75 | 1.531 | 56.0 |
| 5 (Second Face of Second Lens) | −17.929 | 0.00 | | |
| 6 (First Face of Cover Glass) | 0.000 | 0.00 | 1.516 | 64.0 |
| 7 (Second Face of Cover Glass) (Image Surface) | 0.000 | | | |

| Face Number | k | A | B | C | D |
|---|---|---|---|---|---|
| 2 | −7.77E−1 | −1.52E−3 | 1.52E−1 | 4.39E−2 | 3.82E−2 |
| 3 | −3.42 | 7.39E−2 | −1.69E−1 | −5.66E−1 | 1.18 |
| 4 | −1.36E+1 | −1.60E−1 | −2.72E−1 | −1.53 | 6.99 |
| 5 | 1.01E−1 | −4.35E−2 | −2.01E−2 | 8.25E−2 | −1.98E−1 |

Under such conditions, L/fl=1.09 was achieved, thereby satisfying the expression (1). $f_1/f_2$=0.42 was achieved, thereby satisfying the expression (2). $f_1$/fl=1.29 was achieved, thereby satisfying the expression (3). $d_2/d_1$=0.49 was achieved, thereby satisfying the expression (4). $d_1$/fl=0.19 was achieved, thereby satisfying the expression (5). $d_3$/fl=0.22 was achieved, thereby satisfying the expression (6). $f_2$/fl=3.08 was achieved, thereby satisfying the expression (7). S=0 mm was achieved, thereby satisfying the expression (8). Bfl/fl=0.58 was achieved, thereby satisfying the expression (9). Bfl=1.98 mm was achieved, thereby satisfying the expression (10).

Figure 19:
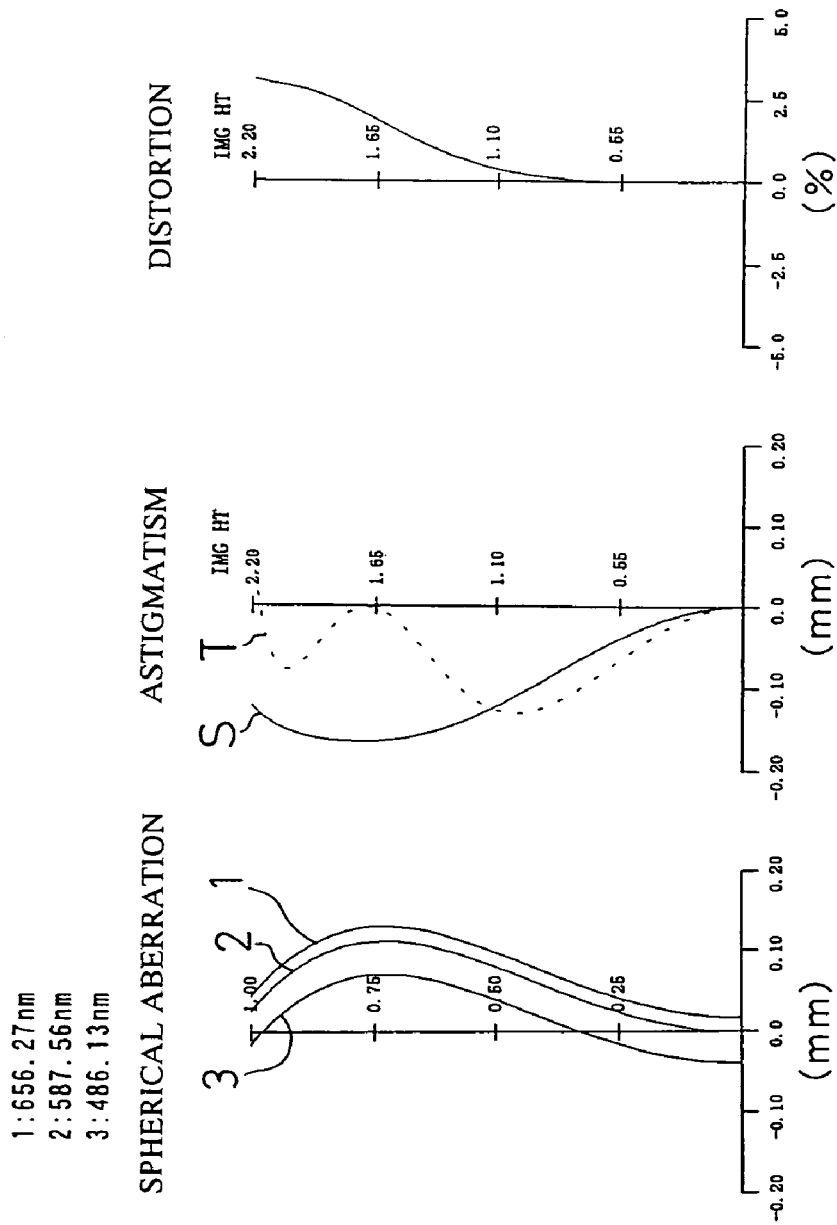
FIG. 19 shows graphs for describing the spherical aberration, astigmatism, and distortion of the imaging lens shown in FIG. 18.

FIG. 19 shows the spherical aberration, astigmatism, and distortion of the imaging lens 1 of the NINTH EXAMPLE.

According to the result, each of the spherical aberration, astigmatism, and distortion was almost satisfied. It can be seen from the result that a sufficient optical property can be obtained.

Tenth Example

Figure 20:
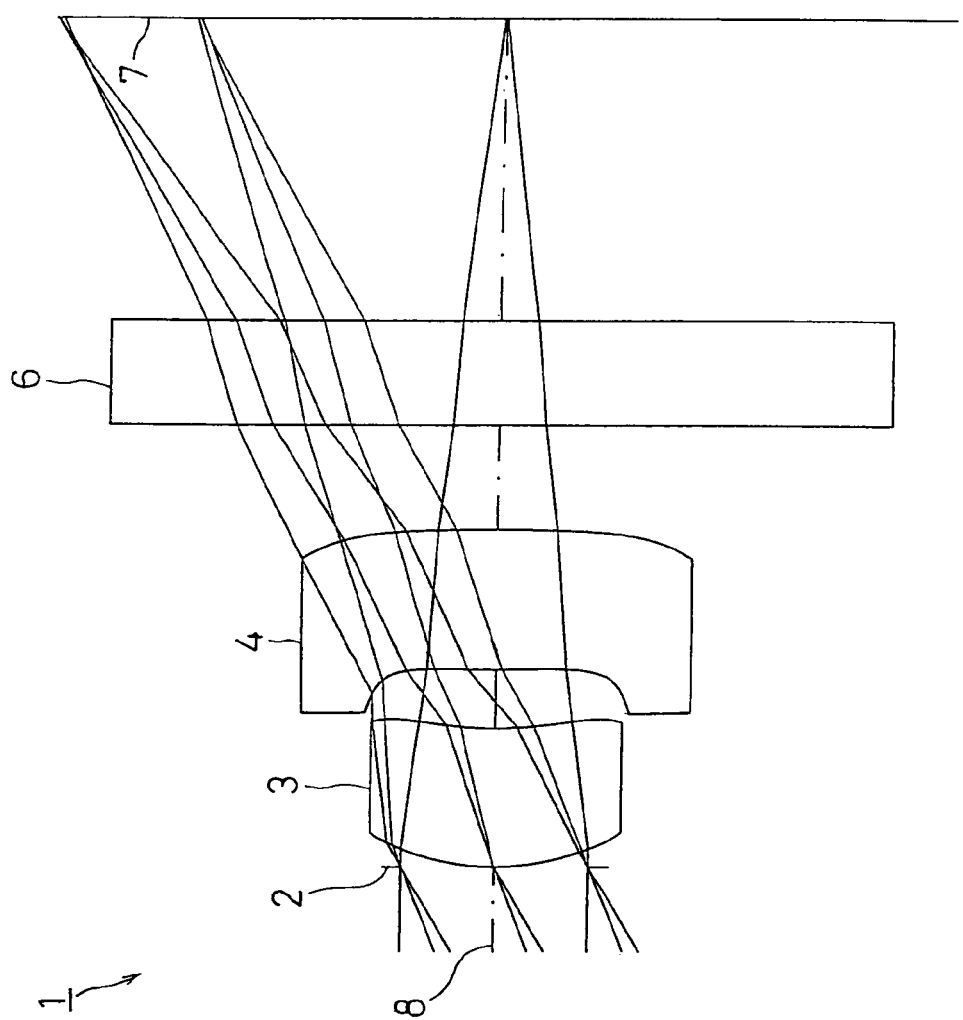
FIG. 20 is a schematic diagram for showing TENTH EXAMPLE of the imaging lens according to the present invention.

FIG. 20 shows a TENTH EXAMPLE of the present invention. In the TENTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of TENTH EXAMPLE was set under the following condition.

Lens Data

L = 2.33 mm, fl = 2.15 mm, $f_1$ = 2.83 mm, $f_2$ = 6.42 mm,
$d_1$ = 0.4 mm, $d_2$ = 0.17 mm, $d_3$ = 0.4 mm, F no = 4.0

| Face Number | r | d | nd | vd |
|---|---|---|---|---|
| (Object Point) | | | | |
| 1 (Diaphragm) | 0.000 | 0.00 | | |
| 2 (First Face of First Lens) | 1.425 | 0.40 | 1.531 | 56.0 |
| 3 (Second Face of First Lens) | 0.950 | 0.10 | | |
| 4 (First Face of Second Lens) | 0.195 | 0.40 | 1.531 | 56.0 |
| 5 (Second Face of Second Lens) | −0.100 | 0.30 | | |
| 6 (First Face of Cover Glass) | 0.000 | 0.30 | 1.516 | 64.0 |
| 7 (Second Face of Cover Glass) (Image Surface) | 0.000 | | | |

| Face Number | k | A | B | C | D |
|---|---|---|---|---|---|
| 2 | −1.97 | −2.97E−1 | 2.21E+1 | −3.05E+2 | 1.51E+3 |
| 3 | −1.03E+1 | −4.44E−1 | 2.01 | −1.47E+2 | 3.51E+2 |
| 4 | 0.00 | −1.54 | −2.67 | −3.03E+2 | 4.35E+3 |
| 5 | 0.00 | −3.28E−1 | −1.31 | 6.96 | −4.50E+1 |

Under such conditions, L/fl=1.08 was achieved, thereby satisfying the expression (1). $f_1/f_2$=0.44 was achieved, thereby satisfying the expression (2). $f_1$/fl=1.32 was achieved, thereby satisfying the expression (3). $d_2/d_1$=0.43 was achieved, thereby satisfying the expression (4). $d_1$/fl=0.19 was achieved, thereby satisfying the expression (5). $d_3$/fl=0.19 was achieved, thereby satisfying the expression (6). $f_2$/fl=2.99 was achieved, thereby satisfying the expression (7). S=0 mm was achieved, thereby satisfying the expression (8). Bfl/fl=0.63 was achieved, thereby satisfying the expression (9). Bfl=1.355 mm was achieved, thereby satisfying the expression (10).

Figure 21:
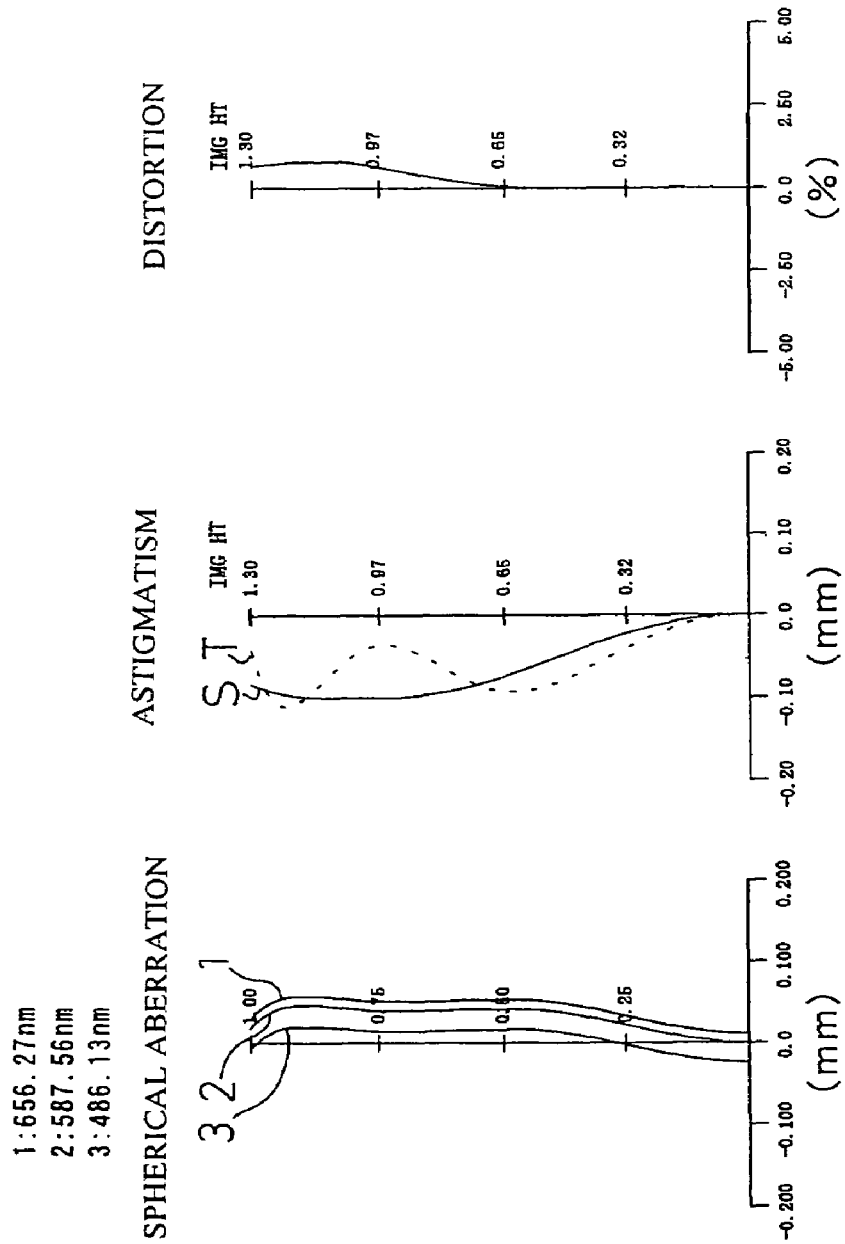
FIG. 21 shows graphs for describing the spherical aberration, astigmatism, and distortion of the imaging lens shown in FIG. 20.

FIG. 21 shows the spherical aberration, astigmatism, and distortion of the imaging lens 1 of the TENTH EXAMPLE.

According to the result, each of the spherical aberration, astigmatism, and distortion was almost satisfied. It can be seen from the result that a sufficient optical property can be obtained.

Eleventh Example

Figure 22:
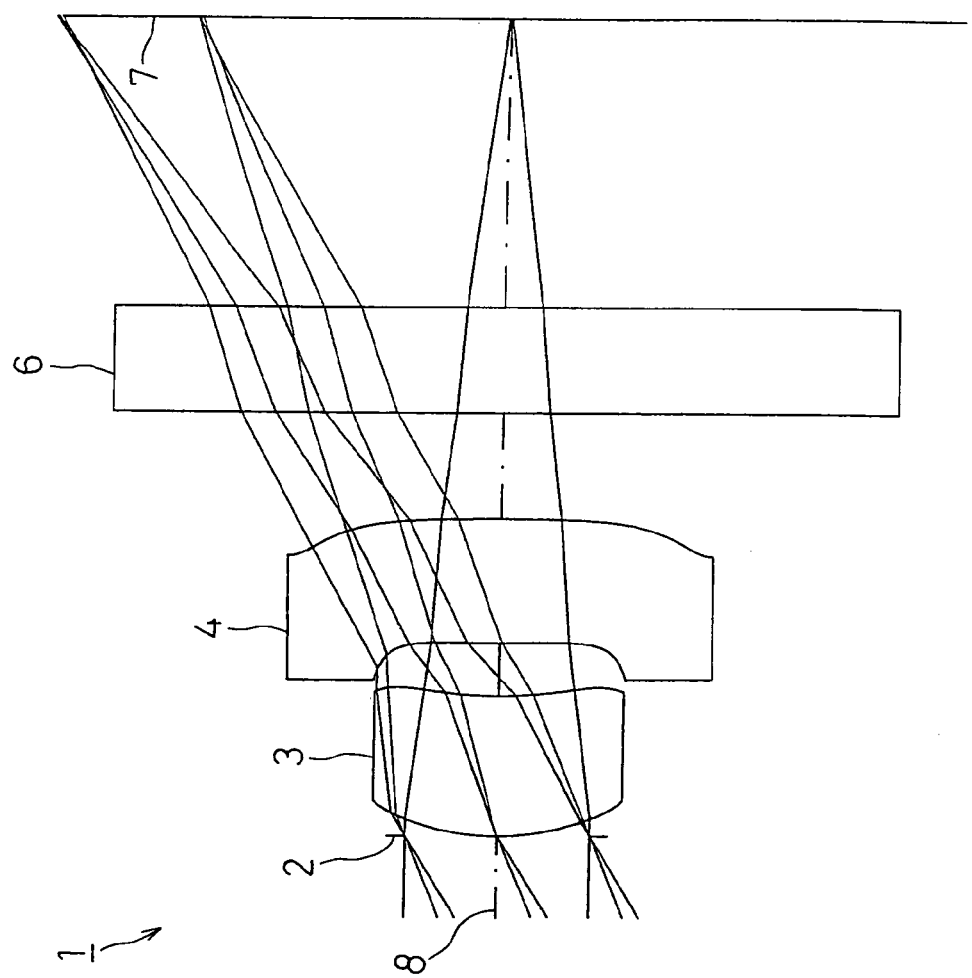
FIG. 22 is a schematic diagram for showing ELEVENTH EXAMPLE of the imaging lens according to the present invention.

FIG. 22 shows an ELEVENTH EXAMPLE of the present invention. In the ELEVENTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the ELEVENTH EXAMPLE was set under the following condition.

Lens Data

L = 2.21 mm, fl = 2.06 mm, $f_1$ = 2.71 mm, $f_2$ = 6.09 mm,
$d_1$ = 0.4 mm, $d_2$ = 0.15 mm, $d_3$ = 0.35 mm, F no = 4.0

| Face Number | r | d | nd | vd |
|---|---|---|---|---|
| (ObjectPoint) | | | | |
| 1 (Diaphragm) | 0.000 | 0.00 | | |
| 2 (First Face of First Lens) | 1.425 | 0.40 | 1.531 | 56.0 |
| 3 (Second Face of First Lens) | 0.985 | 0.15 | | |
| 4 (First Face of Second Lens) | 0.225 | 0.35 | 1.531 | 56.0 |
| 5 (Second Face of Second Lens) | −0.085 | 0.30 | | |

-continued

Lens Data

L = 2.21 mm, fl = 2.06 mm, $f_1$ = 2.71 mm, $f_2$ = 6.09 mm,
$d_1$ = 0.4 mm, $d_2$ = 0.15 mm, $d_3$ = 0.35 mm, F no = 4.0

| | | | | |
|---|---|---|---|---|
| 6 (First Face of Cover Glass) | 0.000 | 0.30 | 1.516 | 64.0 |
| 7 (Second Face of Cover Glass) (Image Surface) | 0.000 | | | |

| Face Number | k | A | B | C | D |
|---|---|---|---|---|---|
| 2 | −3.26 | −4.59E−2 | 3.25E+1 | −4.90E+2 | 2.64E+3 |
| 3 | −4.38 | −1.55 | 1.35E+1 | −2.67E+2 | 5.62E+2 |
| 4 | 0.00 | −2.65 | 2.91E+1 | −1.10E+3 | 1.35E+4 |
| 5 | 0.00 | −6.51E−1 | 4.86E−1 | −6.60E−1 | −5.10E+1 |

Under such conditions, L/fl=1.07 was achieved, thereby satisfying the expression (1). $f_1/f_2$=0.44 was achieved, thereby satisfying the expression (2). $f_1/fl$=1.32 was achieved, thereby satisfying the expression (3). $d_2/d_1$=0.38 was achieved, thereby satisfying the expression (4). $d_1/fl$=0.19 was achieved, thereby satisfying the expression (5). $d_3/fl$=0.17 was achieved, thereby satisfying the expression (6). $f_2/fl$=2.96 was achieved, thereby satisfying the expression (7). S=0 mm was achieved, thereby satisfying the expression (8). Bfl/fl=0.63 was achieved, thereby satisfying the expression (9). Bfl=1.305 mm was achieved, thereby satisfying the expression (10).

Figure 23:
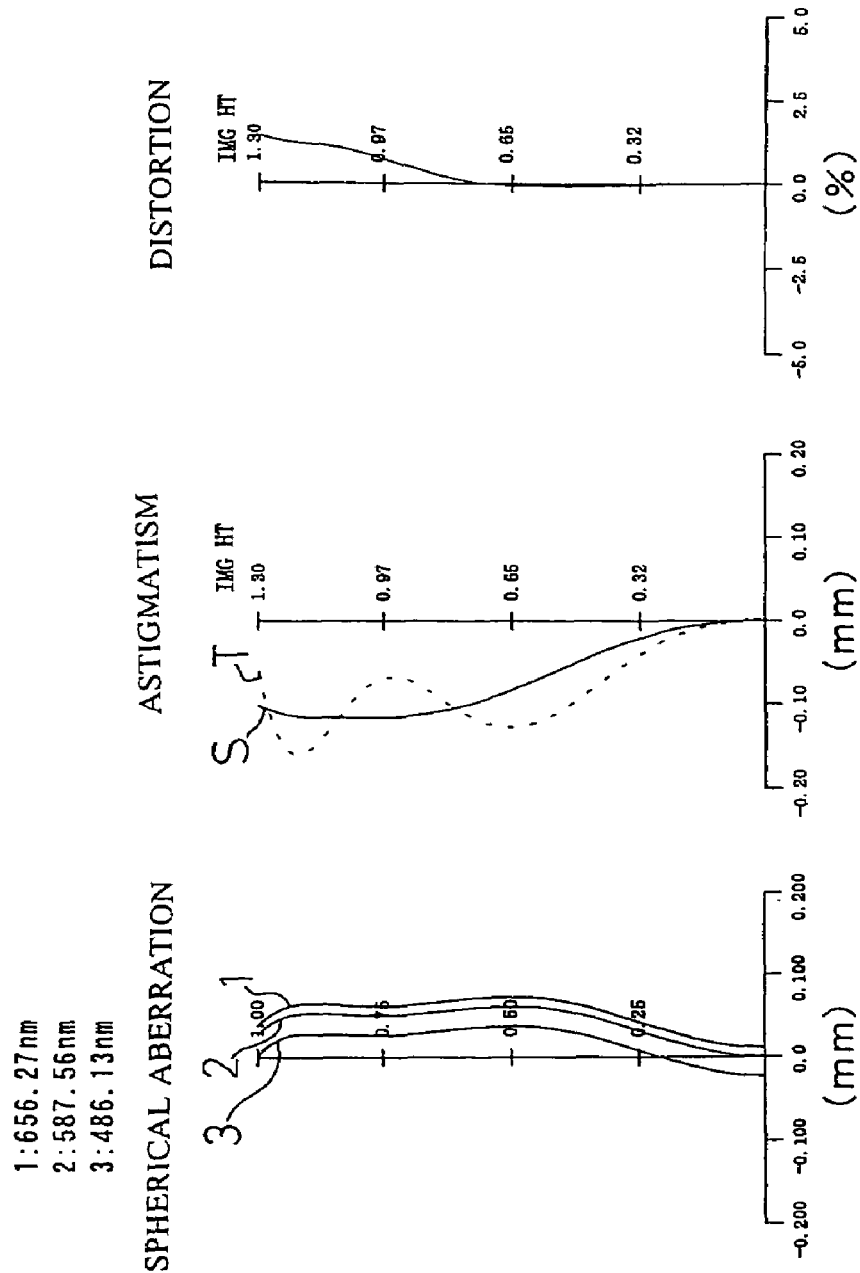
FIG. 23 shows graphs for describing the spherical aberration, astigmatism, and distortion of the imaging lens shown in FIG. 22.

FIG. 23 shows the spherical aberration, astigmatism, and distortion of the imaging lens 1 of the ELEVENTH EXAMPLE.

According to the result, each of the spherical aberration, astigmatism, and distortion was almost satisfied. It can be seen from the result that a sufficient optical property can be obtained.

Twelfth Example

Figure 24:
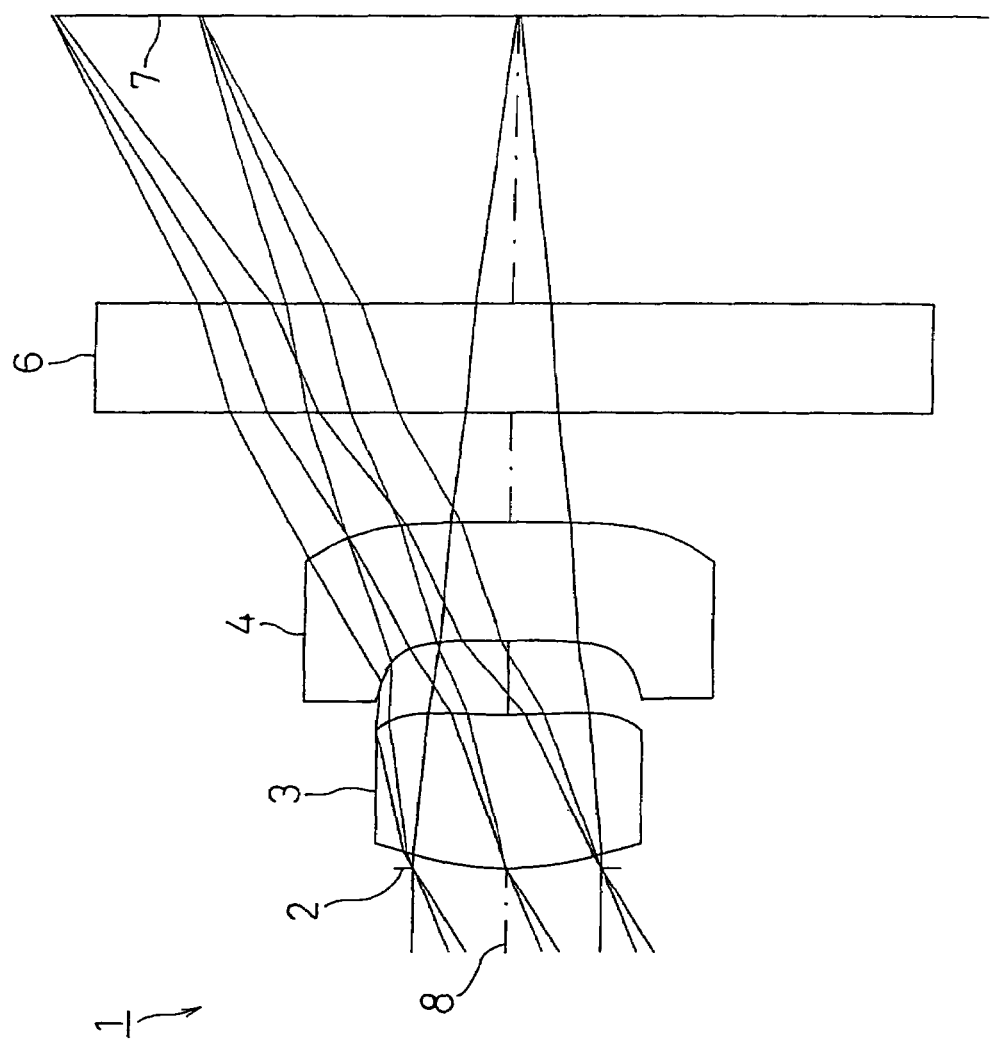
FIG. 24 is a schematic diagram for showing TWELFTH EXAMPLE of the imaging lens according to the present invention.

FIG. 24 shows a TWELFTH EXAMPLE of the present invention. In the TWELFTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the TWELFTH EXAMPLE was set under the following condition.

Lens Data

L = 2.23 mm, fl = 2.05 mm, $f_1$ = 2.4 mm, $f_2$ = 8.4 mm,
$d_1$ = 0.4213 mm, $d_2$ = 0.2015 mm, $d_3$ = 0.3272 mm, F no = 4.0

| Face Number | r | d | nd | νd |
|---|---|---|---|---|
| (ObjectPoint) | | | | |
| 1 (Diaphragm) | 0.000 | 0.00 | | |
| 2 (First Face of First Lens) | 1.215 | 0.42 | 1.531 | 56.0 |
| 3 (Second Face of First Lens) | 0.394 | 0.20 | | |
| 4 (First Face of Second Lens) | 0.015 | 0.32 | 1.531 | 56.0 |
| 5 (Second Face of Second Lens) | −0.020 | 0.30 | | |
| 6 (First Face of Cover Glass) | 0.000 | 0.30 | 1.516 | 64.0 |
| 7 (Second Face of Cover Glass) (Image Surface) | 0.000 | | | |

-continued

Lens Data

L = 2.23 mm, fl = 2.05 mm, $f_1$ = 2.4 mm, $f_2$ = 8.4 mm,
$d_1$ = 0.4213 mm, $d_2$ = 0.2015 mm, $d_3$ = 0.3272 mm, F no = 4.0

| Face Number | k | A | B | C | D |
|---|---|---|---|---|---|
| 2 | −1.51 | −7.61E−1 | 2.04E+1 | −2.64E+2 | 9.09E+2 |
| 3 | 2.24E+1 | −2.30 | −1.92 | −1.10E+2 | 1.54E+2 |
| 4 | 0.00 | −3.40 | 2.11E+1 | −8.31E+2 | 9.36E+3 |
| 5 | 0.00 | −1.03 | 1.95 | −1.41E+1 | 1.44E+1 |

Under such conditions, L/fl=1.09 was achieved, thereby satisfying the expression (1). $f_1/f_2$=0.29 was achieved, thereby satisfying the expression (2). $f_1/fl$=1.17 was achieved, thereby satisfying the expression (3). $d_2/d_1$=0.48 was achieved, thereby satisfying the expression (4). $d_1/fl$=0.21 was achieved, thereby satisfying the expression (5). $d_3/fl$=0.16 was achieved, thereby satisfying the expression (6). $f_2/fl$=4.10 was achieved, thereby satisfying the expression (7). S=0 mm was achieved, thereby satisfying the expression (8). Bfl/fl=0.62 was achieved, thereby satisfying the expression (9). Bfl=1.278 mm was achieved, thereby satisfying the expression (10).

Figure 25:
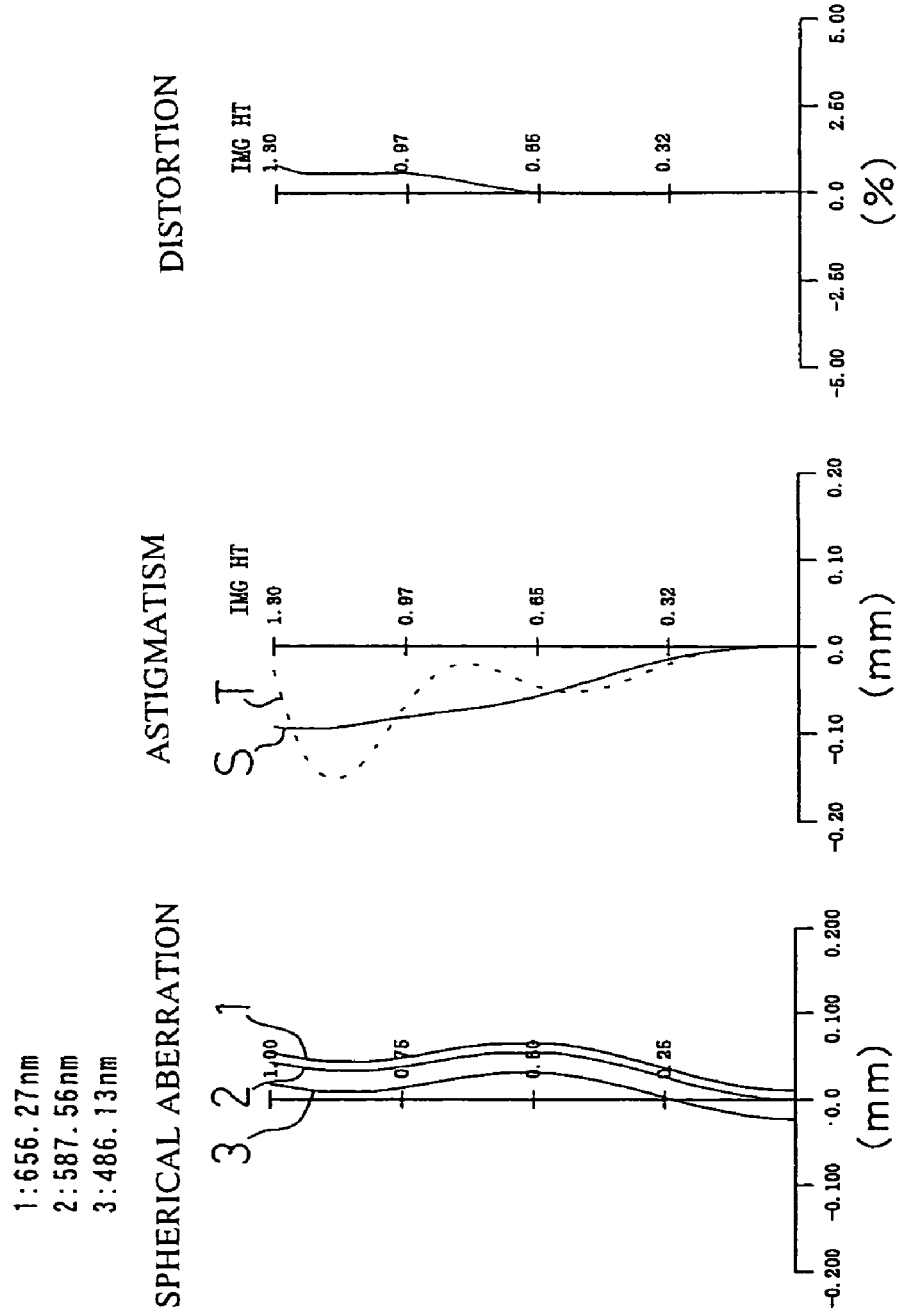
FIG. 25 shows graphs for describing the spherical aberration, astigmatism, and distortion of the imaging lens shown in FIG. 24.

FIG. 25 shows the spherical aberration, astigmatism, and distortion of the imaging lens 1 of the TWELFTH EXAMPLE.

According to the result, each of the spherical aberration, astigmatism, and distortion was almost satisfied. It can be seen from the result that a sufficient optical property can be obtained.

Thirteenth Example

Figure 26:
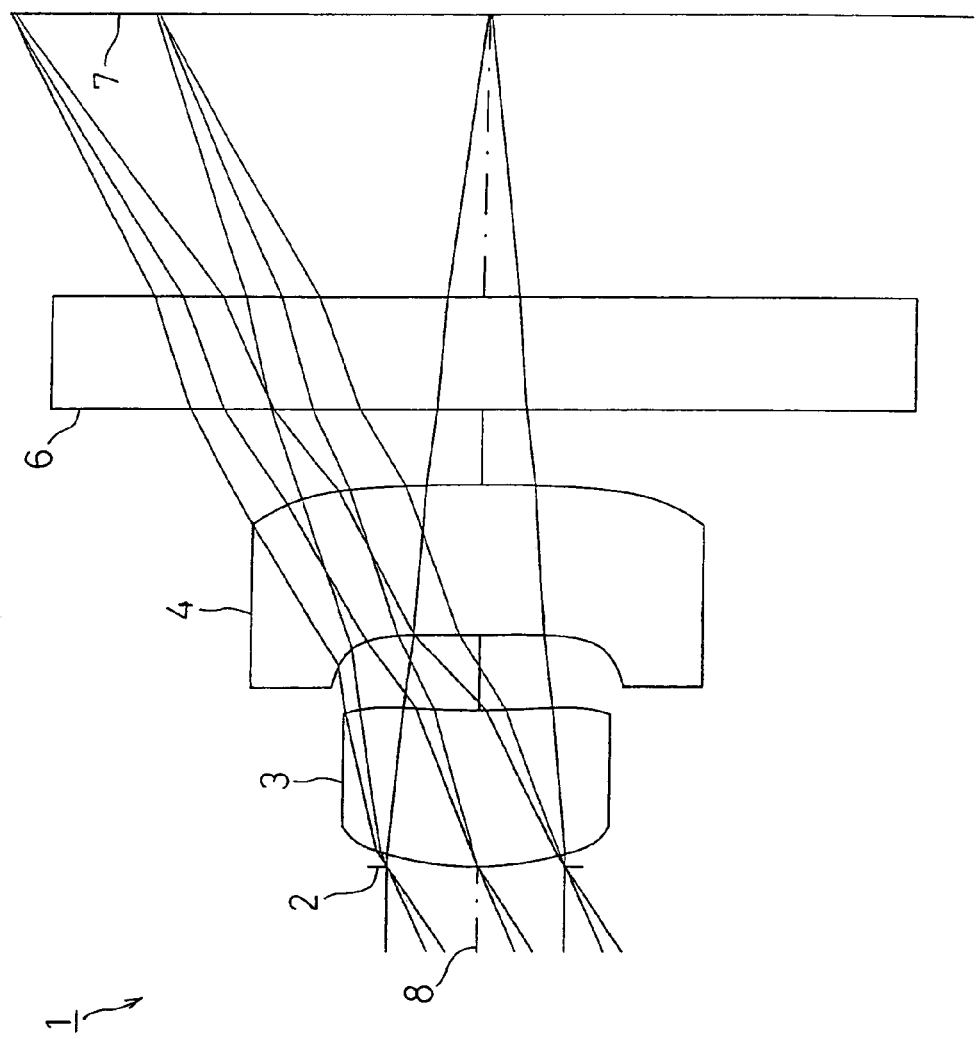
FIG. 26 is a schematic diagram for showing THIRTEENTH EXAMPLE of the imaging lens according to the present invention.

FIG. 26 shows a THIRTEENTH EXAMPLE of the present invention. In the THIRTEENTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the THIRTEENTH EXAMPLE was set under the following condition.

Lens Data

L = 2.17 mm, fl = 1.91 mm, $f_1$ = 2.23 mm, $f_2$ = 8.82 mm,
$d_1$ = 0.42 mm, $d_2$ = 0.2 mm, $d_3$ = 0.4 mm, F no = 4.0

| Face Number | r | d | nd | νd |
|---|---|---|---|---|
| (ObjectPoint) | | | | |
| 1 (Diaphragm) | 0.000 | 0.00 | | |
| 2 (First Face of First Lens) | 1.230 | 0.42 | 1.531 | 56.0 |
| 3 (Second Face of First Lens) | 0.468 | 0.20 | | |
| 4 (First Face of Second Lens) | 0.100 | 0.40 | 1.531 | 56.0 |
| 5 (Second Face of Second Lens) | −0.115 | 0.30 | | |
| 6 (First Face of Cover Glass) | 0.000 | 0.30 | 1.516 | 64.0 |
| 7 (Second Face of Cover Glass) (Image Surface) | 0.000 | | | |

-continued

Lens Data

L = 2.17 mm, fl = 1.91 mm, $f_1$ = 2.23 mm, $f_2$ = 8.82 mm,
$d_1$ = 0.42 mm, $d_2$ = 0.2 mm, $d_3$ = 0.4 mm, F no = 4.0

| Face Number | k | A | B | C | D |
|---|---|---|---|---|---|
| 2 | −2.06 | −9.89E−1 | 4.78E+1 | −8.61E+2 | 5.42E+3 |
| 3 | 2.83E+1 | −2.01 | 3.37 | −1.39E+2 | 2.91E+2 |
| 4 | 0.00 | −1.79 | −1.20 | −2.76E+2 | 3.79E+3 |
| 5 | 0.00 | −3.04E−1 | −2.07 | 1.22E+1 | −4.80E+1 |

Under such conditions, L/fl=1.14 was achieved, thereby satisfying the expression (1). $f_1/f_2$=0.25 was achieved, thereby satisfying the expression (2). $f_1$/fl=1.17 was achieved, thereby satisfying the expression (3). $d_2/d_1$=0.48 was achieved, thereby satisfying the expression (4). $d_1$/fl=0.22 was achieved, thereby satisfying the expression (5). $d_3$/fl=0.21 was achieved, thereby satisfying the expression (6). $f_2$/fl=4.62 was achieved, thereby satisfying the expression (7). S=0 mm was achieved, thereby satisfying the expression (8). Bfl/fl=0.60 was achieved, thereby satisfying the expression (9). Bfl=1.15 mm was achieved, thereby satisfying the expression (10).

Figure 27:
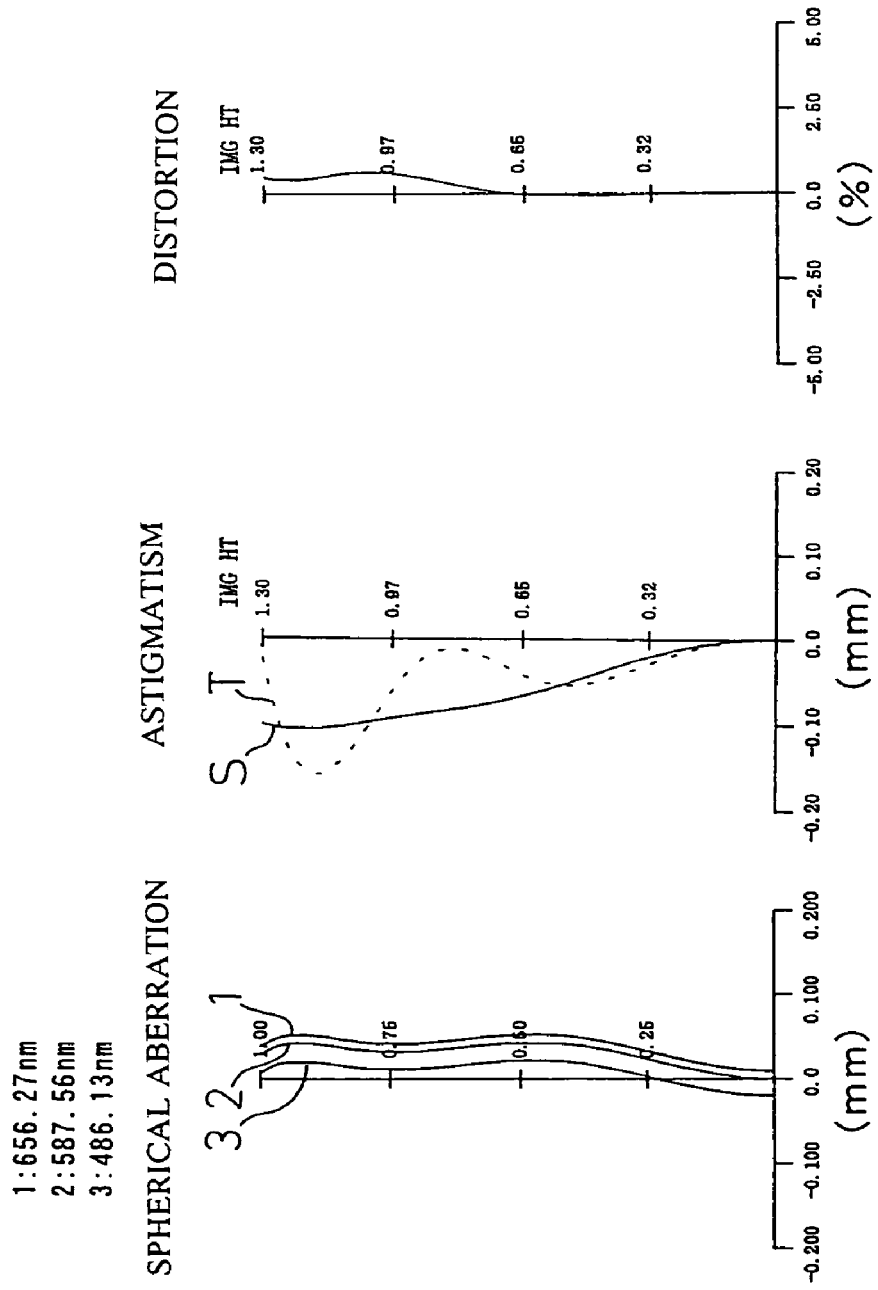
FIG. 27 shows graphs for describing the spherical aberration, astigmatism, and distortion of the imaging lens shown in FIG. 26.

FIG. 27 shows the spherical aberration, astigmatism, and distortion of the imaging lens 1 of the THIRTEENTH EXAMPLE.

According to the result, each of the spherical aberration, astigmatism, and distortion was almost satisfied. It can be seen from the result that a sufficient optical property can be obtained.

Fourteenth Example

Figure 28:
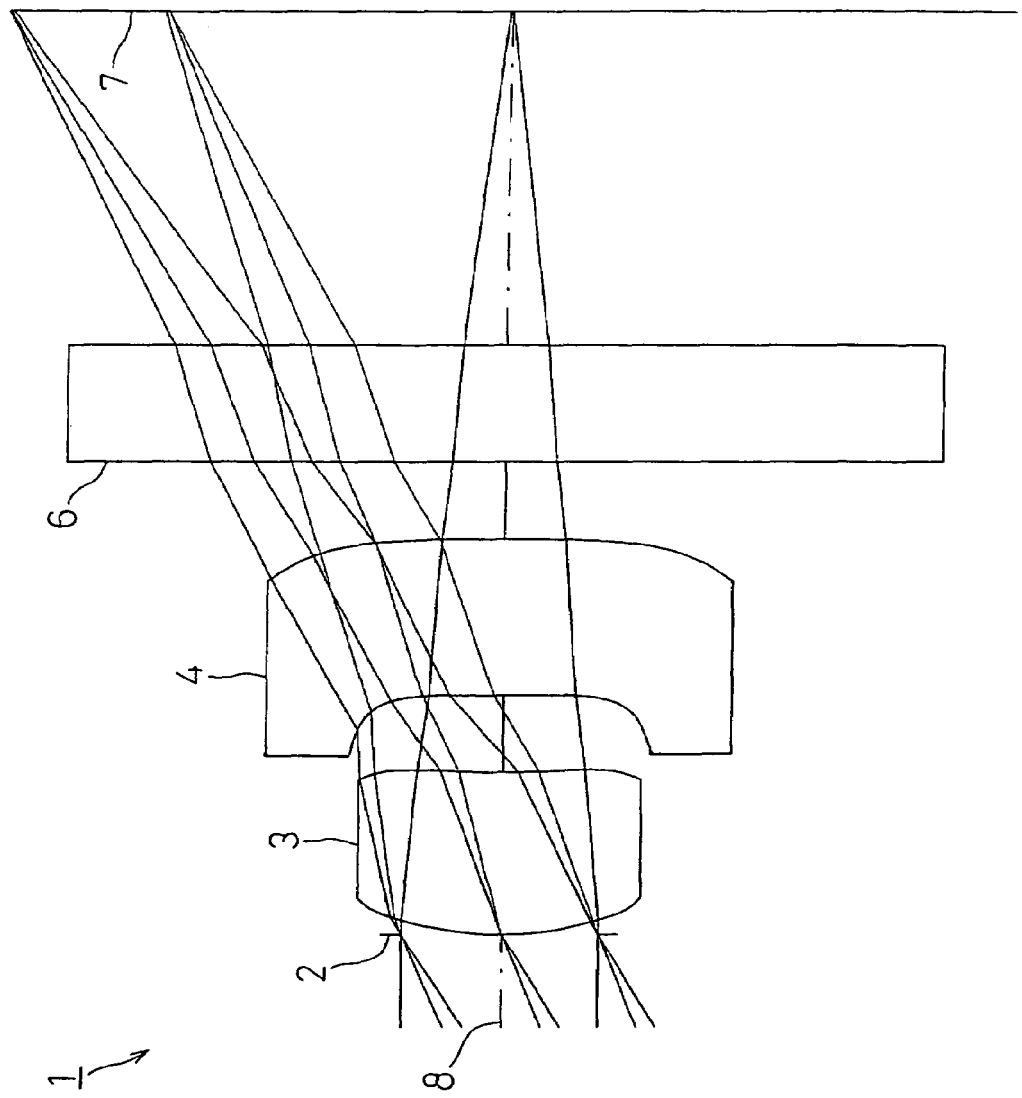
FIG. 28 is a schematic diagram for showing FOURTEENTH EXAMPLE of the imaging lens according to the present invention.

FIG. 28 shows a FOURTEENTH EXAMPLE of the present invention. In the FOURTEENTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the FOURTEENTH EXAMPLE was set under the following condition.

Lens Data

L = 2.28 mm, fl = 2.03 mm, $f_1$ = 2.33 mm, $f_2$ = 10.05 mm,
$d_1$ = 0.42 mm, $d_2$ = 0.2 mm, $d_3$ = 0.4 mm, F no = 4.0

| Face Number | r | d | nd | vd |
|---|---|---|---|---|
| (ObjectPoint) | | | | |
| 1 (Diaphragm) | 0.000 | 0.00 | | |
| 2 (First Face of First Lens) | 1.200 | 0.42 | 1.531 | 56.0 |
| 3 (Second Face of First Lens) | 0.475 | 0.20 | | |
| 4 (First Face of Second Lens) | 0.080 | 0.40 | 1.531 | 56.0 |
| 5 (Second Face of Second Lens) | −0.100 | 0.00 | | |
| 6 (First Face of Cover Glass) | 0.000 | 0.300 | 1.516 | 64.0 |
| 7 (Second Face of Cover Glass) (Image Surface) | 0.000 | | | |

| Face Number | k | A | B | C | D |
|---|---|---|---|---|---|
| 2 | −1.45 | −1.02 | 3.63E+1 | −5.83E+2 | 3.14E+3 |
| 3 | 2.29E+1 | −2.03 | 3.05E−1 | −1.17E+2 | 2.41E+2 |
| 4 | 0.00 | −1.48 | −1.21E+1 | −1.38E+2 | 2.76E+3 |
| 5 | 0.00 | −2.31E−1 | −2.43 | 1.04E+1 | −3.96E+1 |

Under such conditions, L/fl=1.12 was achieved, thereby satisfying the expression (1). $f_1/f_2$=0.23 was achieved, thereby satisfying the expression (2). $f_1$/fl=1.15 was achieved, thereby satisfying the expression (3). $d_2/d_1$=0.48 was achieved, thereby satisfying the expression (4). $d_1$/fl=0.21 was achieved, thereby satisfying the expression (5). $d_3$/fl=0.20 was achieved, thereby satisfying the expression (6). $f_2$/fl=4.95 was achieved, thereby satisfying the expression (7). S=0 mm was achieved, thereby satisfying the expression (8). Bfl/fl=0.62 was achieved, thereby satisfying the expression (9). Bfl=1.255 mm was achieved, thereby satisfying the expression (10).

Figure 29:
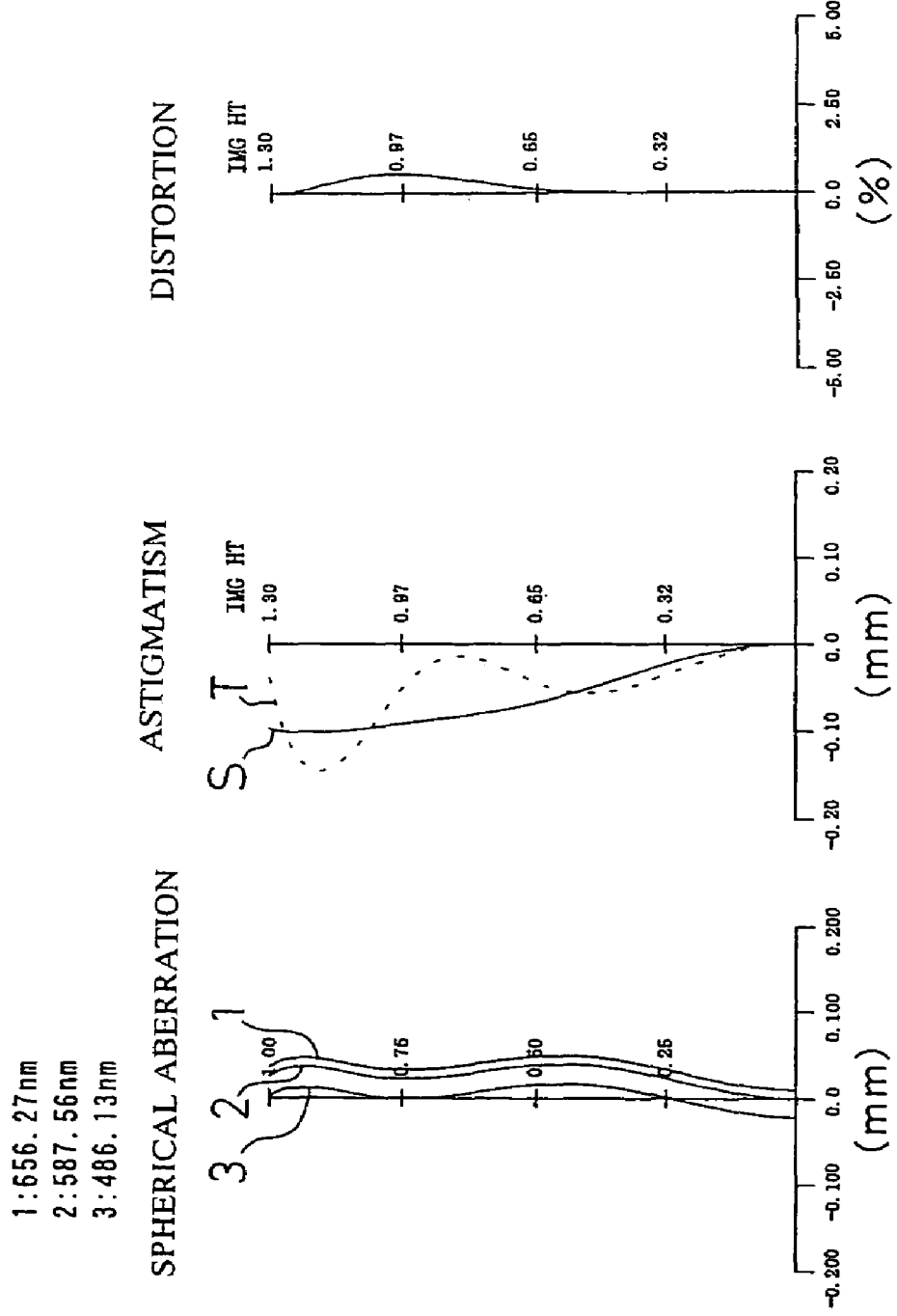
FIG. 29 shows graphs for describing the spherical aberration, astigmatism, and distortion of the imaging lens shown in FIG. 28.

FIG. 29 shows the spherical aberration, astigmatism, and distortion of the imaging lens 1 of the FOURTEENTH EXAMPLE.

According to the result, each of the spherical aberration, astigmatism, and distortion was almost satisfied. It can be seen from the result that a sufficient optical property can be obtained.

Fifteenth Example

Figure 30:
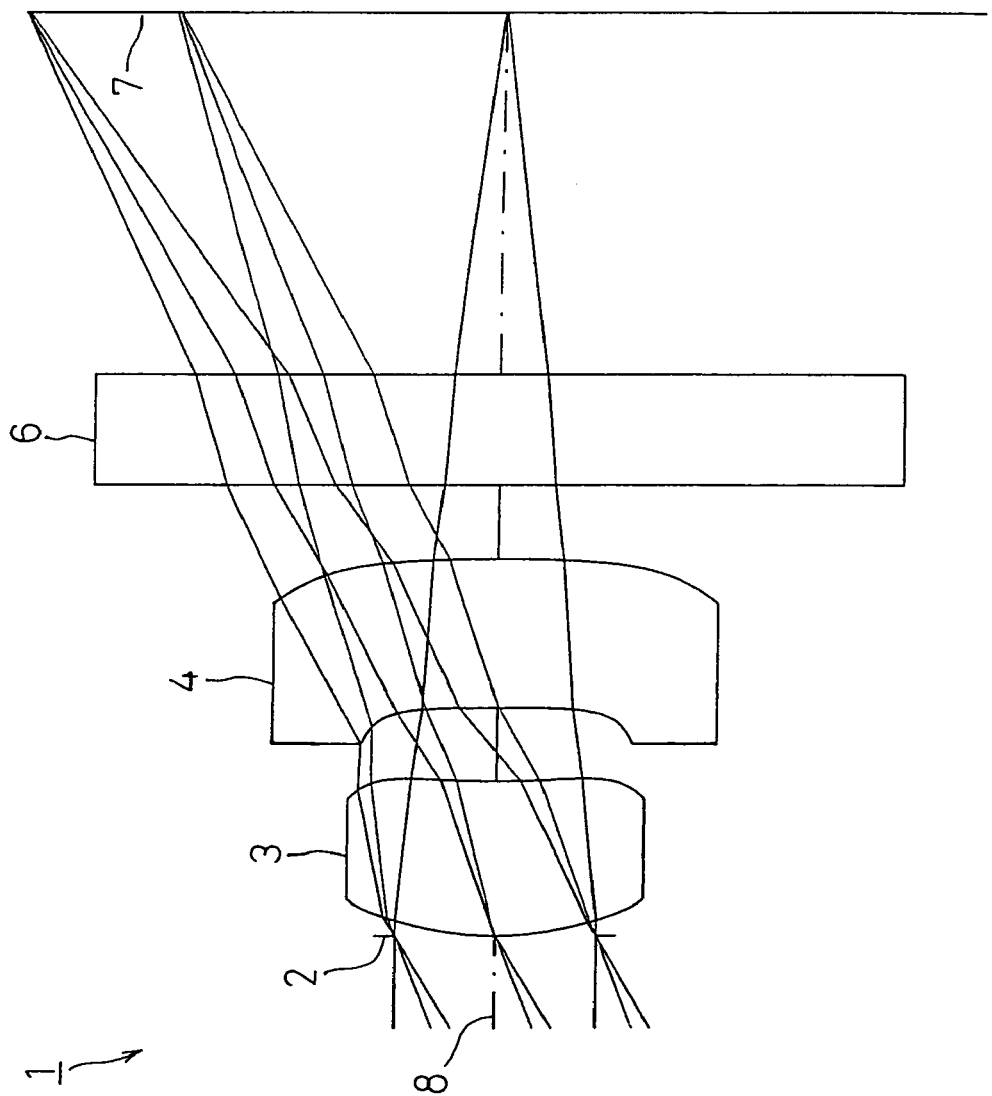
FIG. 30 is a schematic diagram for showing FIFTEENTH EXAMPLE of the imaging lens according to the present invention.

FIG. 30 shows a FIFTEENTH EXAMPLE of the present invention. In the FIFTEENTH EXAMPLE, like the imaging lens with the structure of FIG. 1, a diaphragm 2 is disposed on the object side of the first face of the first lens 3 and a cover glass is disposed between the second face of the second lens 4 and the image-taking surface 7, as a filter 6. The diaphragm 2 is disposed at the same position on the optical axis 8 as the point on the optical axis 8 on the first face of the first lens 3.

The imaging lens 1 of the FIFTEENTH EXAMPLE was set under the following condition.

Lens Data

L = 2.40 mm, fl = 2.16 mm, $f_1$ = 2.44 mm, $f_2$ = 11.76 mm,
$d_1$ = 0.42 mm, $d_2$ = 0.2 mm, $d_3$ = 0.4 mm, F no = 4.0

| Face Number | r | d | nd | vd |
|---|---|---|---|---|
| (ObjectPoint) | | | | |
| 1 (Diaphragm) | 0.000 | 0.00 | | |
| 2 (First Face of First Lens) | 1.200 | 0.42 | 1.531 | 56.0 |
| 3 (Second Face of First Lens) | 0.520 | 0.20 | | |
| 4 (First Face of Second Lens) | −0.005 | 0.40 | 1.531 | 56.0 |
| 5 (Second Face of Second Lens) | −0.165 | 0.30 | | |
| 6 (First Face of Cover Glass) | 0.000 | 0.30 | 1.516 | 64.0 |
| 7 (Second Face of Cover Glass) (Image Surface) | 0.000 | | | |

| Face Number | k | A | B | C | D |
|---|---|---|---|---|---|
| 2 | −1.42E−1 | −8.30E−1 | 1.65E+1 | −2.33E+2 | 1.00E+3 |
| 3 | 1.87E+1 | −1.91 | −3.22 | −7.96E+1 | 6.24E+1 |
| 4 | 0.00 | −2.04 | 7.05 | −4.34E+2 | 4.71E+3 |
| 5 | 0.00 | −4.30E−1 | 4.66E+1 | −8.18 | 1.24E+1 |

Under such conditions, L/fl=1.11 was achieved, thereby satisfying the expression (1). $f_1/f_2$=0.21 was achieved, thereby satisfying the expression (2). $f_1$/fl=1.13 was achieved, thereby satisfying the expression (3). $d_2/d_1$=0.48 was achieved, thereby satisfying the expression (4). $d_1$/fl=0.19 was achieved, thereby satisfying the expression (5). $d_3$/fl=0.19 was achieved, thereby satisfying the expression (6). $f_2$/fl=5.44 was achieved, thereby satisfying the expression (7). S=0 mm was achieved, thereby satisfying the expression (8). Bfl/fl=0.64 was achieved, thereby satisfying the expression (9). Bfl=1.375 mm was achieved, thereby satisfying the expression (10).

Figure 31:
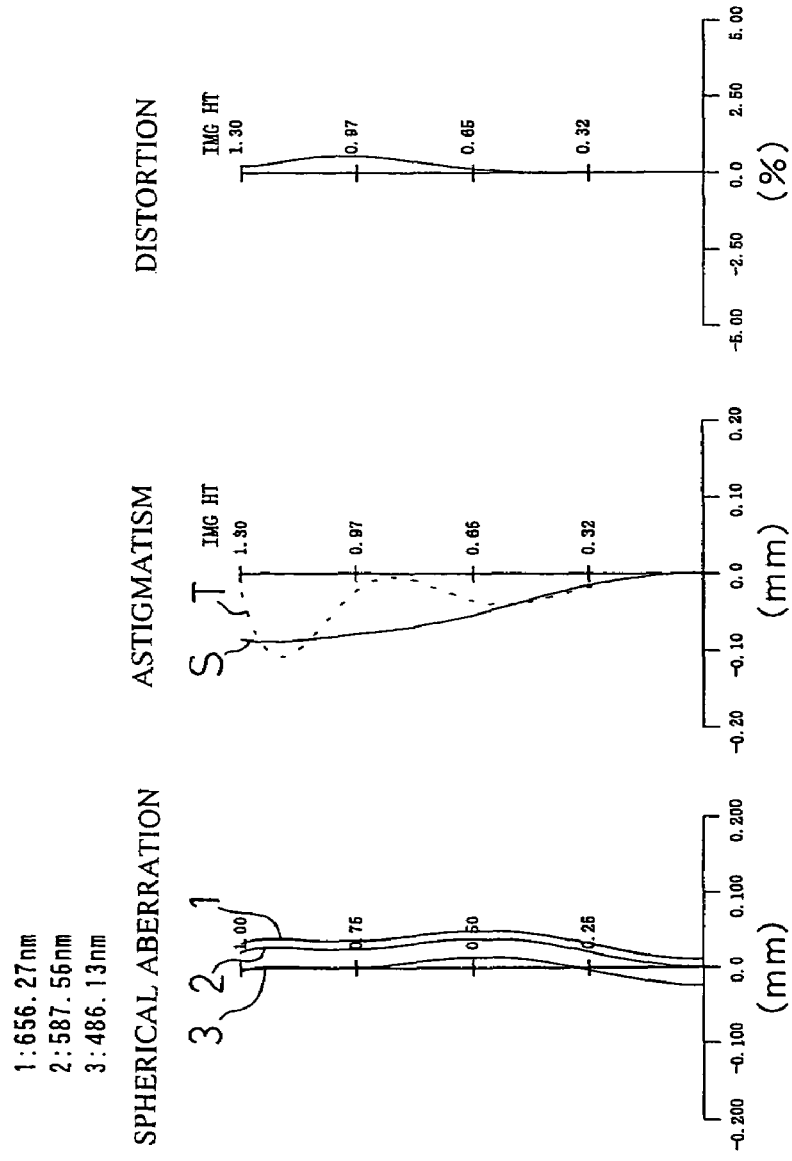
FIG. 31 shows graphs for describing the spherical aberration, astigmatism, and distortion of the imaging lens shown in FIG. 30.

FIG. 31 shows the spherical aberration, astigmatism, and distortion of the imaging lens 1 of the FIFTEENTH EXAMPLE.

According to the result, each of the spherical aberration, astigmatism, and distortion was almost satisfied. It can be seen from the result that a sufficient optical property can be obtained.

The present invention is not limited to the above-described embodiments and EXAMPLES, and various modifications are possible as required.

For example, a light amount limiting board can be disposed between the second face of the first lens 3 and the first face of the second lens 4 as required.

What is claimed is:

1. An imaging lens used for forming an image of an object on an image-taking surface of a solid image pickup device, comprising:

in order from an object side towards an image surface side, a diaphragm, a first lens which is a meniscus lens having a positive power whose convex surface faces said object side, and a second lens which is a lens having a positive power whose convex surface faces said image surface side, wherein conditions expressed by each of following expressions (1)-(6) are to be satisfied;

$$1.25 \geq L/fl \geq 0.8 \tag{1}$$

$$1 \geq f_1/f_2 \geq 0.2 \tag{2}$$

$$1.8 \geq f_1/fl \geq 1 \tag{3}$$

$$0.5 > d_2/d_1 \geq 0.2 \tag{4}$$

$$0.35 \geq d_1/fl \geq 0.1 \tag{5}$$

$$0.27 \geq d_3/fl \geq 0.1 \tag{6}$$

where,
L: entire length of said imaging lens
fl: focal distance of entire imaging lens
$f_1$: focal distance of said first lens
$f_2$: focal distance of said second lens
$d_1$: center thickness of said first lens
$d_2$: space between said first lens and said second lens on an optical axis
$d_3$: center thickness of said second lens.

2. The imaging lens according to claim 1, wherein, said second lens is a meniscus lens.

3. The imaging lens according to claim 1, wherein an object side surface of said second lens is convex towards said object side in the vicinity of said optical axis and is formed into an aspheric surface having an inflection point.

4. The imaging lens according to claim 3, wherein
an outer end section of an effective diameter of said object side face of said second lens is positioned closer to said object side than a point on said optical axis on said object side face of said second lens.

5. The imaging lens according to any one of claims 1 to 4, wherein
a condition expressed by a following expression (7) is to be satisfied;

$$10 \geq f_2/fl \geq 1.5 \tag{7}$$

6. The imaging lens according to claim 5, wherein
said diaphragm satisfies a condition expressed by a following expression (8);

$$0.2 \geq S \tag{8}$$

where,
S: distance between said diaphragm and said optical surface closest to said object side on said optical axis.

7. The imaging lens according to claim 6, wherein
a condition expressed by a following expression (9) is to be satisfied;

$$0.8 \geq Bfl/fl \geq 0.4 \tag{9}$$

where,
Bfl: back focus distance (distance from a last lens surface to said image-taking surface on said optical axis).

8. The imaging lens according to claim 7, wherein
a condition expressed by a following expression (10) is to be satisfied;

$$2.5 \geq Bfl \geq 0.8 \tag{10}$$

* * * * *